(12) United States Patent
Rodman

(10) Patent No.: US 10,434,731 B2
(45) Date of Patent: Oct. 8, 2019

(54) COMPOSITE STRUCTURES HAVING EMBEDDED MECHANICAL FEATURES

(71) Applicant: Vision Composite Products, LLC, Decatur, AL (US)

(72) Inventor: William L. Rodman, Bellevue, WA (US)

(73) Assignee: VISION COMPOSITE PRODUCTS, LLC, Decatur, AL (US)

( * ) Notice: Subject to any disclaimer, the term of this patent is extended or adjusted under 35 U.S.C. 154(b) by 0 days.

(21) Appl. No.: 14/530,524

(22) Filed: Oct. 31, 2014

(65) Prior Publication Data

US 2015/0114548 A1 Apr. 30, 2015

Related U.S. Application Data

(60) Provisional application No. 61/897,924, filed on Oct. 31, 2013.

(51) Int. Cl.
| | | |
|---|---|---|
| *B32B 38/00* | (2006.01) | |
| *B29C 70/70* | (2006.01) | |
| *B29C 70/86* | (2006.01) | |
| B29L 31/30 | (2006.01) | |
| B29C 70/48 | (2006.01) | |

(52) U.S. Cl.
CPC ............ *B29C 70/70* (2013.01); *B29C 70/865* (2013.01); *B29C 70/48* (2013.01); *B29L 2031/3076* (2013.01); *Y10T 156/1002* (2015.01)

(58) Field of Classification Search
CPC ......... B29C 43/00; B29C 70/44; B29C 70/70; B29C 70/865

USPC ................. 156/196, 285, 586, 286
See application file for complete search history.

(56) References Cited

U.S. PATENT DOCUMENTS

| | | | | |
|---|---|---|---|---|
| 1,504,547 A | * | 8/1924 | Egerton | B29C 49/44 |
| | | | | 264/258 |
| 2,744,043 A | * | 5/1956 | Ramberg | B29C 53/602 |
| | | | | 156/155 |
| 3,369,843 A | | 2/1968 | Prew | |
| 4,053,667 A | * | 10/1977 | Smith | 428/36.1 |
| 4,072,358 A | | 2/1978 | Ridha | |
| 4,294,490 A | | 10/1981 | Woelfel | |
| 4,294,639 A | | 10/1981 | Woelfel | |
| 4,376,749 A | | 3/1983 | Woelfel | |
| 4,514,013 A | | 4/1985 | Woelfel | |
| 4,532,097 A | | 7/1985 | Daniels | |
| 4,583,933 A | | 4/1986 | Woelfel | |
| 4,636,344 A | | 1/1987 | McDougall | |

(Continued)

*Primary Examiner* — Philip C Tucker
*Assistant Examiner* — John Blades
(74) *Attorney, Agent, or Firm* — Frank M. Caprio; Ryan J. Letson; Bradley Arant Boult Cummings LLP

(57) ABSTRACT

A complex-shaped, three-dimensional fiber reinforced composite structure may be formed by using counteracting pressures applied to a structural lay-up of wetted fibers with mechanical features embedded or encapsulated therein. The mechanical features may be located on or at least partially between two or more pressurizable members, which may be internally pressurized within a mold. The mechanical features may operate as bearing plates, attachment fittings, or other structural elements. Assemblies of pressurizable members, fiber plies and mechanical features may be arranged to create complex composite structures with predefined load paths, enhanced structural capability or both.

10 Claims, 26 Drawing Sheets

(56) References Cited

U.S. PATENT DOCUMENTS

| | | |
|---|---|---|
| 4,721,342 A | 1/1988 | Daniels |
| 4,749,235 A | 6/1988 | McDougall |
| RE32,949 E | 6/1989 | Woelfel et al. |
| 4,927,347 A | 5/1990 | Golata et al. |
| 5,045,261 A | 9/1991 | Weeks |
| 5,152,949 A * | 10/1992 | Leoni ................. B29C 43/3642 264/257 |
| 5,234,259 A | 8/1993 | Nishimuro et al. |
| 5,282,673 A | 2/1994 | Koyama et al. |
| 5,344,219 A | 9/1994 | Adrian et al. |
| 5,826,948 A | 10/1998 | Schroeder et al. |
| 6,033,612 A | 3/2000 | Adams |
| 6,068,350 A | 5/2000 | Baumgarten et al. |
| 6,726,292 B1 | 4/2004 | Schroeder et al. |
| 7,040,714 B2 | 5/2006 | Schroeder et al. |
| 7,361,296 B2 | 4/2008 | Adrian |
| 7,615,171 B2 | 11/2009 | Schroeder et al. |
| 7,918,513 B2 | 4/2011 | Wilson |
| 2005/0104441 A1 | 5/2005 | Bertelson |
| 2005/0269866 A1 | 12/2005 | McGoon |
| 2006/0011294 A1* | 1/2006 | Rajabali ................ B29C 70/088 156/285 |
| 2008/0224360 A1* | 9/2008 | Ashton et al. ................ 264/503 |
| 2009/0041972 A1* | 2/2009 | Rodman ........................ 428/85 |
| 2010/0164147 A1* | 7/2010 | Rodman ............ B29C 43/3642 264/503 |
| 2012/0043014 A1 | 2/2012 | Lim |
| 2012/0146395 A1 | 6/2012 | Silva |
| 2013/0049443 A1 | 2/2013 | Heb |
| 2013/0221555 A1 | 8/2013 | Radtke |
| 2013/0221731 A1 | 8/2013 | Hess |
| 2014/0030478 A1* | 1/2014 | Wittenberg ........... B29C 70/885 428/137 |
| 2015/0130261 A1 | 5/2015 | Warren |
| 2015/0231917 A1 | 8/2015 | Dressler |

\* cited by examiner

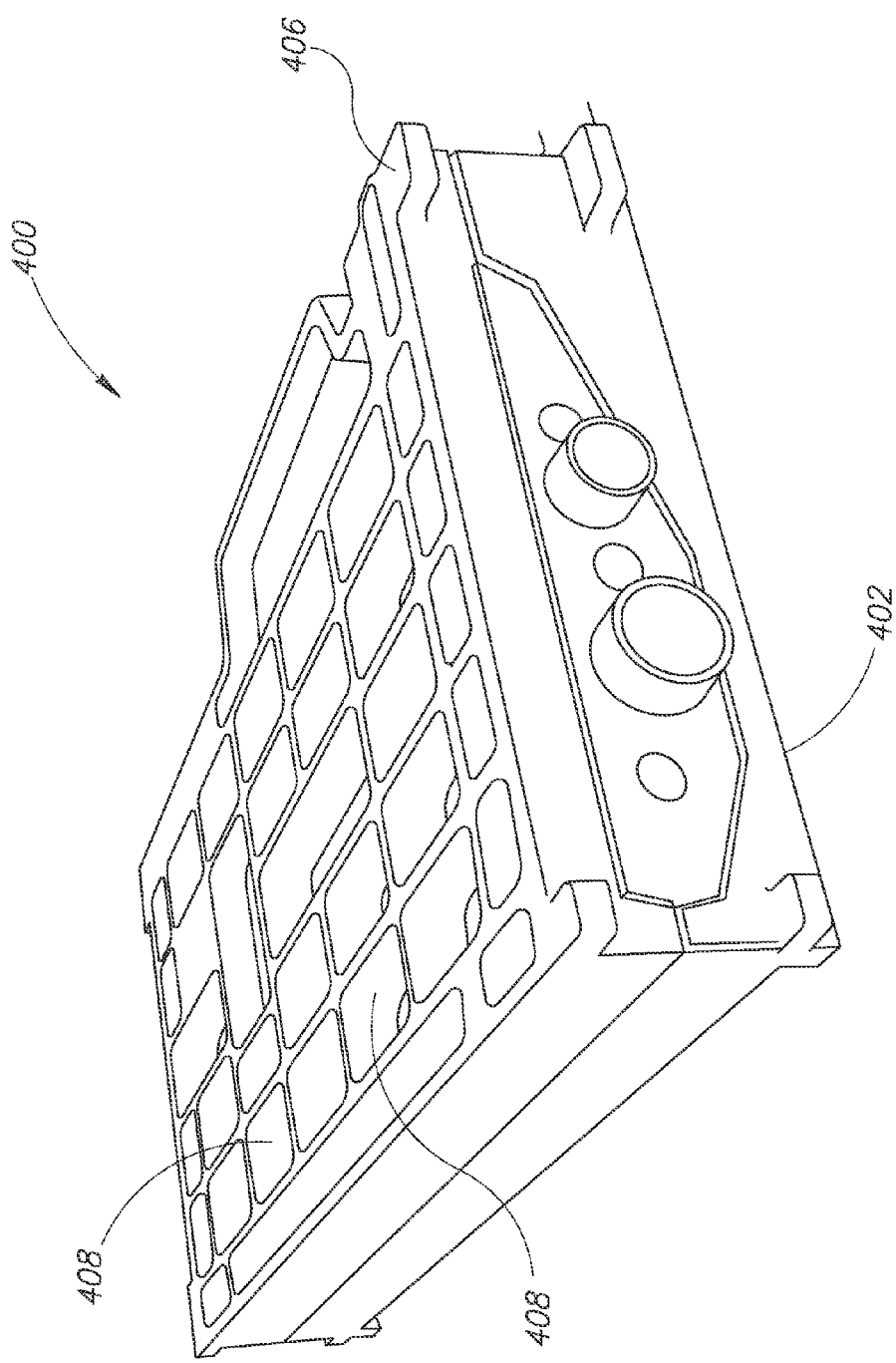

COMPOSITE STRUCTURES HAVING EMBEDDED MECHANICAL FEATURES

PRIORITY CLAIM

This application claims priority from U.S. Provisional Patent Application No. 61/897,924 filed on Oct. 31, 2013; this application also claims the benefit of and is related to U.S. Patent Publication No. 2013/0154154; and the subject matter of each application is incorporated herein by reference in its entirety.

FIELD OF THE INVENTION

The present invention generally relates to fiber-reinforced composite structures having one or more encapsulated or embedded mechanical features, and methods for manufacturing such composite structures.

BACKGROUND

Metal structures have conventionally been used to create fittings, provide bearing surfaces and attachment means because metal is readily machine-able and typically more easily inspected as compared to fiber-reinforced composite structures. Metallic fittings are used in extensively in aircraft structures as interfaces between structural components, such as between a landing gear door and an aircraft fuselage. Metallic fittings take the form of hinges, structural splices, component attach points, and numerous other applications. Therefore, methods for using fittings in any structural application are important.

Structural composite materials are made from high tensile strength fibers and resin. The proportions of fibers and resins are carefully controlled to maximize the effective tensile and compressive strengths. However, even the hardest, toughest, and strongest composite materials are considered "soft" when compared to high strength metals, and have poor properties when machined or drilled. Specifically, drilling a fastener hole cuts the fibers within the structure and, therefore, significantly weakens it. Therefore, attaching a composite component to a metallic fitting or vice-versa is an engineering art that requires considerable skill.

The aircraft industry has captured these methods in numerous design guides and manuals. In general, two methods of attaching composite materials to metallic fittings are in use. One method for integrating a mechanical feature in a composite structure is based on a drilled and assembled fastener pattern. The patterns, to the extent possible, are optimized based on the shape of the pattern, number of fasteners, choice of fasteners, washers, nuts, bearing plates, torque, interference, and other variables. Regardless of hardware (nuts, bolts, washers, etc.), mechanical fastening is limited by its inherent process of cutting fibers (drilling and countersinking a hole), and forcing mating surfaces together—thereby crushing (and potentially exceeding the compressive strength of the composite material. It is not uncommon for bolts to pull through composite materials because joint loads exceed capability. The thicknesses of composite material should compensate for the cut fibers and low compressive strength, which typically results in additional composite material, and thus additional weight. This extra material is considered parasitic weight that is theoretically unnecessary, except for its function at the joint. This parasitic weight can total up to thirty percent of a composite component's weight.

Another method for integrating a mechanical feature into a composite structure is referred to as chemical bonding. Some examples are chemical bonding may include chemical etching and preparation of the surface (phosphoric acid anodize, chromic acid anodize, sol-gel treatments); mechanical preparation of the surface (splines, knurling, sanding, cross hatching); mechanical locking configurations (machined features that mechanically lock and bond a fitting onto the composite article); and load dropping features (ply drop offs that minimize load concentrations).

Although it is theoretically possible to bond a metallic fitting to a composite article, either during or after the composite article manufacturing process, aircraft materials and process experts rarely allow those bonds to be considered in structural applications. In spite of the disallowance of the structural bond as a load carrying mechanism, it is somewhat common to see bonded fittings in composite articles. Usually, when bonded joints like this are accomplished, "chicken" fasteners are used to prevent peeling and/or provide alternate load paths to the bonded joint. It is rare that this type of joint would result in any weight advantage compared to a traditional fastened joint described above.

The term "failsafe" is an aircraft engineering term that, in essence, means: "if, for some reason, a structural load path fails, such as a bond line between a fitting and a component, an alternate load path between the fitting and the component will carry the intended design loads so there is no loss of function." As noted above, fittings are sometimes machined to have mechanical locking features that, when used in combination with bonding methods, results in the composite part being locked onto the fitting. It should be noted that when this method is employed, the fitting is likely to be inside of the composite article, and the materials wrapped around its exterior. Depending on configuration, this approach can result in a failsafe design. However, this approach has very limited configurations that are useful since most are circular or rectangular by necessity. And, to create these shapes, external pressure has to be applied during the manufacturing process.

BRIEF SUMMARY OF THE INVENTION

The present invention is generally directed toward processes and structures made by those processes in which one or more mechanical features are embedded and/or integrated into a complex, three dimensionally shaped fiber-reinforced composite structure. Furthermore, the present invention generally relates to complex-shaped three-dimensional fiber reinforced composite structures and methods of making the same using autoclave, oven or other techniques while minimizing buckling, warping, distortion, porosity or other undesirable phenomena when embedding or integrating the mechanical features. One aspect of the invention provides a method for manufacturing complex-shaped, three-dimensional composite structures using counteracting acting pressures applied to a structural lay-up of fiber plies where these pressures operate to embed or integrate mechanical features between fiber plies with the objectives of minimizing structural weight while providing sufficient load carrying and/or load transferring capabilities.

In one aspect of the present invention, a method of making a composite structure includes the steps of (1) arranging a plurality of pressurizable members to form an assembly, each of the pressurizable members having a desired shape before pressurization that includes an outer surface and an inner surface defining a volumetric region, each of the pressurizable members further having an opening to permit internal pressurization thereof, wherein at least one of the pressurizable members includes a recessed region; (2) arranging at least one layer of fiber plies onto at least one surface of each of the plurality of pressurizable members, wherein at least some of the plies are pressed into the recessed region to substantially conform therewith; (3) locating a mechanical feature onto the recessed region on top of the at least one layer of fiber plies; (4) arranging at least another layer of fiber plies over the mechanical feature to substantially encapsulate the mechanical feature in the assembly; (5) placing the assembly in a tool; (6) providing an internal pressure to the pressurizable members; and (7) providing an external pressure to the assembly to form the composite structure, wherein the internal and external pressures operate to compress the fiber plies around the mechanical feature while substantially minimizing voids between the fiber plies and the mechanical feature.

BRIEF DESCRIPTION OF THE DRAWINGS

Preferred and alternative embodiments of the present invention are described in detail below with reference to the following drawings:

FIG. 7B is a perspective view of the lower bottom tool of FIG. 7A with an upper tool located thereon according to an embodiment of the invention;

DETAILED DESCRIPTION OF THE INVENTION

Figure 1A:
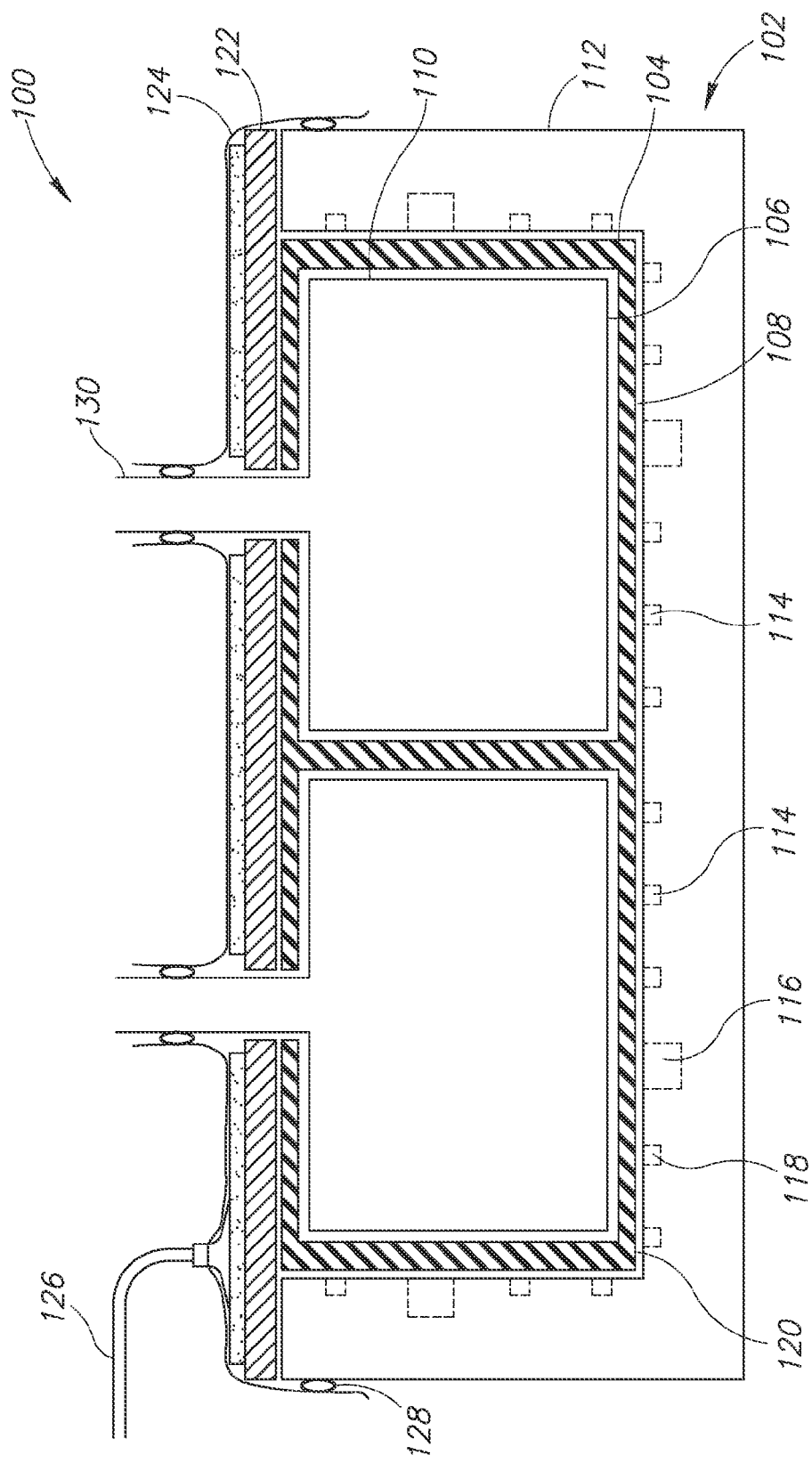
FIG. 1A schematically shows a method of making a complex shaped, three-dimensional composite structure in a mold optionally having resin feeder grooves where fiber plies are arranged on sufficiently rigid pressurizable members and pressurized within the mold using a bagging film according to an embodiment of the invention.

In the following description, certain specific details are set forth in order to provide a thorough understanding of various embodiments of the invention. However, one skilled in the art will understand that the invention may be practiced without these details. In other instances, well-known structures associated with composite structures, the tooling to produce the same, and methods of making, configuring and/or operating any of the above have not necessarily been shown or described in detail to avoid unnecessarily obscuring descriptions of the embodiments of the invention.

The present invention is generally directed to the inclusion of mechanical features within a composite structure. U.S. patent application Ser. Nos. 11/835,261; 12/176,981; 12/330,391; and 12/565,602 describe how pressurizable members may be arranged to produce complex-shaped composite assemblies and/or structures, and those patent applications are hereby incorporated by reference in their entireties. The present invention is further directed to overcoming the problems related to embedding and/or integrating mechanical features into composite structures while maintaining an overall structural integrity of the assembly.

Generally, a composite structure includes a laminate area between integral ribs. The laminate area is commonly referred to as a panel. Thus, a core-stiffened panel is a laminate that uses a cored feature, such as a honeycomb sheet, to increase its buckling strength. A complex-shaped composite structure is understood to have multiple panels, which in turn means that it will include multiple "bays" that, using conventional composite assembly methods, must be fastened together. The processes and structures made therewith according to the present invention may produce complex-shaped composite structures wherein various mechanical features are integrated into the composite structure during a fiber ply lay-up process.

Referring to FIGS. 1A-3, a complex-shaped, three-dimensional fiber reinforced composite structure may be formed by using counteracting acting pressures applied to a structural lay-up of fiber plies. The fiber plies are arranged on pressurizable members that become an integral part of the final product, or may be removed, depending on the accessibility of the member. In a preferred embodiment, the pressurizable member is a hollow rotomolded thermoplastic member, a blow molded thermoplastic member, a superplastic formed metallic member, or a twin sheet vacuum formed member (TSVF) having an opening or vent. An opening or vent allows an inner surface of the pressurizable member to be vented or pressurized such that it is expanded or inflated against the fiber plies. Advantageously, the vented pressurizable member allows the complex-shaped, three-dimensional fiber reinforced composite structure to be produced using elevated temperature, pressure, and/or autoclave techniques. By means of the opening, pressure within the pressurizable members may be equalized as temperature rises or additional pressure may be applied, as in the use of an autoclave. In one embodiment, a number of the pressurizable members which may be of different sizes and have complex shapes, are arranged to form a large, complex-shaped lay-up surface for the fiber plies.

The ability to equalize the pressure in the pressurizable members allows for the production of complex-shaped, three-dimensional structures such as frames, intercostals, ribs, etc. and further permits the fiber plies to maintain their correct geometric shape. The production of these features often necessitates the creation of interior walls, flanges, shear webs and other structural design features, referred to herein as unsupported, free or internal features that are generally defined as having opposing surfaces adjacent to pressurizable members or as not having a primary surface situated between a pressurizable member and a tooling or mold surface.

FIG. 1A schematically shows an autoclave system 100 having a tooling assembly or mold 102 according to an embodiment of the invention. Fiber plies 104 are arranged on pressurizable members 106 and the resulting assembly 108 is placed in the mold 102. The arrangement of the fiber plies 104 and the manufacturing of the pressurizable members 106 will be described in greater detail below. For purposes of clarity only, the illustrated embodiment shows the outer surface 110 of the pressurizable members 106 as separated or spaced apart from the fiber plies 104. However, during assembly, it is appreciated that the fiber plies 104 are laid up directly onto the outer surface 110 of the pressurizable members 106.

The mold 102 is a leak tight system having a mold body 112 optionally formed with feeder grooves or channels 114 to infuse matrix material (not shown) into or sufficiently wet the fiber plies 104. The feeder grooves 114 may include main feeder grooves 116 and distribution channels 118. Alternatively, the feeder grooves 114 may be included in the pressurizable members 106, which is an embodiment described below. However in many instances, it is preferable to include the feeder grooves 114 into the mold 102 to minimize matrix material pockets, uneven matrix material surfaces, or similar matrix material-related imperfections that could affect the quality of the finished fiber reinforced composite structure. For aerospace components, it is generally considered an unacceptable design condition to have matrix material pockets, uneven matrix material surfaces, or similar matrix material-related imperfections because such imperfections may increase the likelihood of cracking in the residual matrix material. Accordingly, if feeder grooves 114 are utilized than it is preferable to form the feeder grooves 114 into the mold body 112. In one embodiment, the mold 102 is a tightly (i.e., close tolerance) machined clamshell type mold 102.

In one embodiment, a removable, stiffened peel ply 120 may be laid up or take the form as an outer layer or outer ply on the outer surface 110 of the fiber plies 104. The stiffened peel ply 120 could then be peeled or otherwise separated from the fiber plies 104 after the matrix material is cured. By way of example, the stiffened peel ply 120 permits the matrix material associated with the feeder grooves 114 to be peeled away from fiber plies 104 during finishing operations (i.e., post matrix material cure). There are numerous means of injecting or infusing the fiber plies 104 with matrix material and once a decision to use tool side feeder grooves 114 is made, the arrangement, volumetric flow rate, and volumetric capacity, for example, of the feeder grooves 114 may be optimized or otherwise controlled for the particular structural component being manufactured.

As temperature is increased, the different matrix materials may be utilized to achieve improved results. For example and when the matrix material comprises a resin, a number of different resins may be employed based on the processing temperature, for example a polyethylene resin may be used at low temperatures, an epoxy, phenolic, or bismaleimide resing at medium temperatures, and finally a polyimide resin at higher temperatures. In addition to the above, other resins such as nylon, polyethersulfone (PES), polyetherimide (PEI), or acetal may be used to customize the fiber-reinforced structure.

In the illustrated embodiment, the mold 102 may include a caul sheet 122, a bagging film 124, and a probe 126. The caul sheet 122 may be coupled to the mold body 112 to secure the fiber plies 104 and the pressurizable members 106 within the mold 102. The caul sheet 122 may take the form of a sheet or plate material that is generally placed in immediate contact with the fiber plies 104 during curing to transmit normal pressure and provide a smooth surface on the finished component. In one embodiment, the caul sheet 122 takes the form of a stiffened three ply sheet material, but may take other forms depending on the autoclave system 100 and other design considerations.

The bagging film 124 is sealed to various portions of the mold 102 with sealant 128. In addition, the bagging film 124 is sealed to sprues or pressure ports 130 extending from the pressurizable members 106. The bagging film 124 preferably takes the form of a three ply porous breather material, but may take other forms depending on the autoclave system 100 and other design considerations.

The probe 126 typically operates to place the fiber plies 104 under a vacuum pressure by removing a fluid from the mold 102. In other embodiments, however, it is appreciated that the probe 126 may operate to increase the pressure within the mold 102. The bagging film 124 may also be sealed to the probe 126 using the sealant 128. In addition, the fluid may be a gas or liquid, such as, but not limited to, air or oil.

Figure 1B:
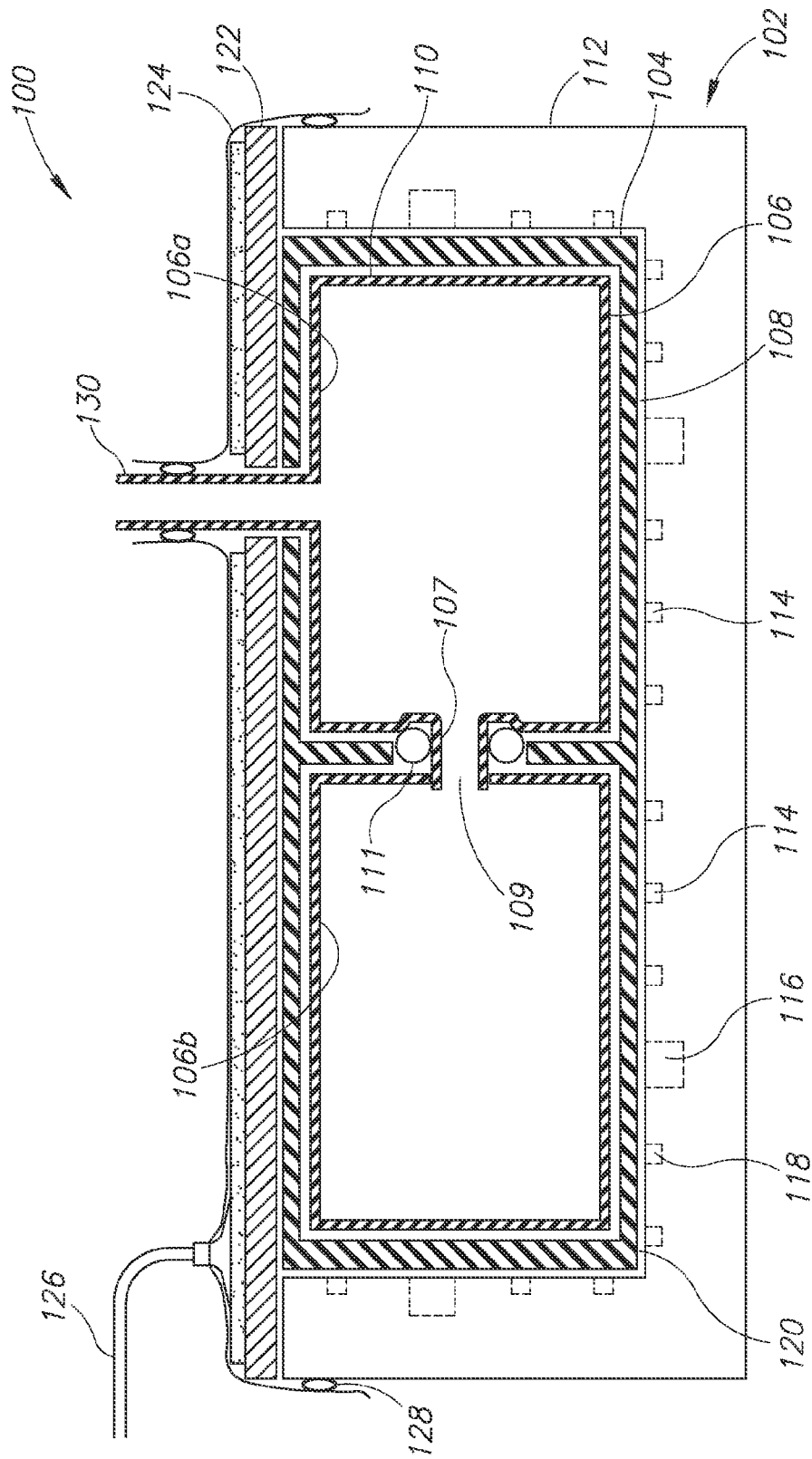
FIG. 1B schematically shows a method of making a complex shaped, three-dimensional composite structure in a mold where fiber plies are arranged on sufficiently rigid and interconnected pressurizable members within the mold according to an embodiment of the invention.

FIG. 1B schematically shows the autoclave system 100 having a tooling assembly, tool or mold 102 according to another embodiment of the invention. The illustrated embodiment is substantially similar to the previous embodiment so that like numbers are re-used except where there are differences. In this embodiment, the fiber plies 104 are arranged on interconnecting pressurizable members 106a and 106b within the mold 102. Again and for purposes of clarity only, the illustrated embodiment shows an outer surface 110 of the pressurizable members 106a, 106b as separated or spaced apart from the fiber plies 104. However during assembly, it is appreciated that the fiber plies 104 are laid up directly onto the outer surface 110 of the pressurizable members 106a, 106b.

The interconnected pressurizable members 106a, 106b are in fluid communication with one another. As illustrated, pressurizable member 106a includes a first fluid port 107 that extends into a second fluid port 109 of pressurizable member 106b. In addition, the fiber plies 104 are arranged so they do not block or interfere with the ports 107, 109. As the pressure inside of pressurizable member 106a is changed via the single sprue 130, the pressure inside of pressurizable member 106b changes accordingly due to the fluid interconnection. To seal the pressurizable members 106a, 106b during pressurization, an amount of sealant 111 may be located around the first fluid port 107. Preferably, the sealant 111 is arranged so that it does not extrude into the fiber plies 104 during pressurization.

Figure 2:
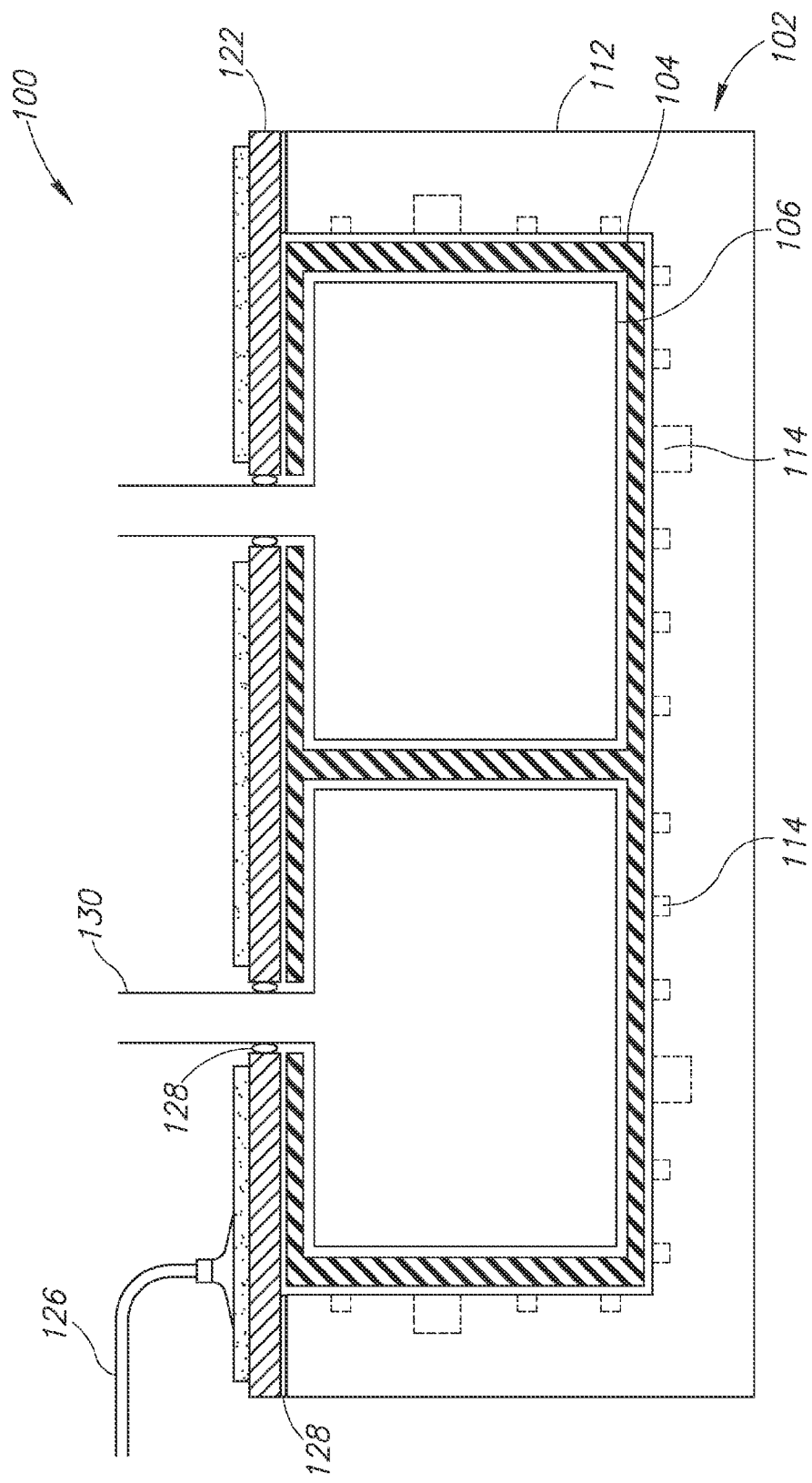
FIG. 2 schematically shows an alternative method of making a complex shaped, three-dimensional composite structure in a mold having resin feeder grooves where fiber plies are arranged on sufficiently rigid pressurizable members and pressurized within the mold using sealed mold halves according to an embodiment of the invention.

FIG. 2 shows a slightly different embodiment for pressurizing the autoclave system 100 without using the bagging film 124. In this embodiment, the caul sheet 122 is sealed against the mold body 112 of the mold 102 and the sprues 130 of the pressurizable members 106. It is appreciated that other autoclave system 100 configurations and methods of sealing the mold 102 may operate in accordance with the invention, but they will not be further described herein for purposes of brevity.

Figure 3:
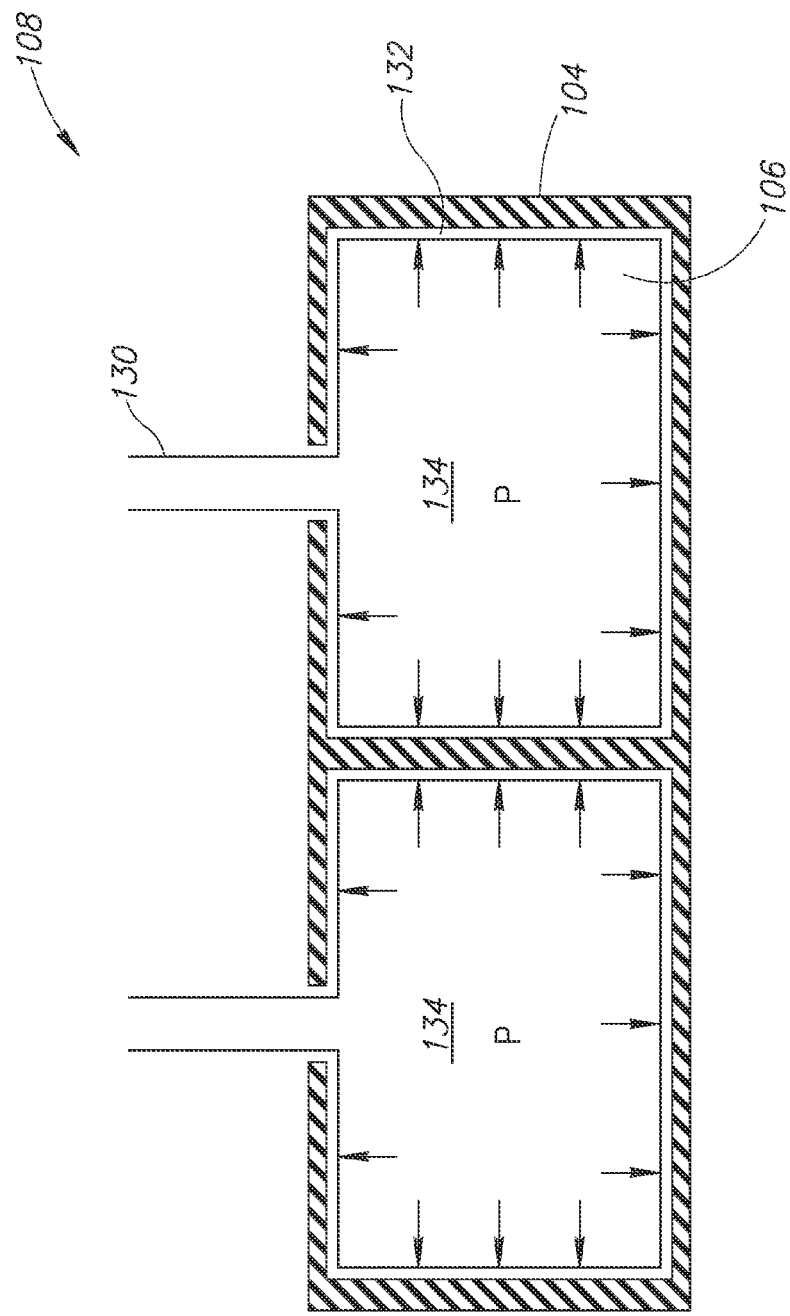
FIG. 3 shows the fiber plies arranged on the sufficiently rigid pressurizable members according to an embodiment of the invention.

FIG. 3 shows the assembly 108 comprising the fiber plies 104 and the pressurizable members 106. The pressurizable members 106 may be configured to be non-removable after the fiber plies 104 and injected or infused matrix material are cured. The integration of the pressurizable members 106 with the fiber plies 104 to make the flyaway component may or may not be accomplished by using a bondable material therebetween. When making complex flyaway components, it may be desirable to include the pressurizable members 106 as a permanent part of the flyway component. However, the type of material, the size, and the weight of the pressurizable members 106 would likely have to be closely controlled for the flyway component to meet its design requirements. For example, when making aerospace components, the thickness of the pressurizable members 106 will add to the overall weight of the flyway component. If the members 106 are too thin, or if they are not made of a durable material, then the bagging details may collapse, split or explode during pressurization and curing of the assembly 108 within the mold 102 (FIG. 1). Additionally, the presence of the pressurizable members 106 in contact with the fiber plies 104 could affect the engineering properties of the flyway component. In addition, the strength, properties, and structural reliability of the bondable material 132 will need to be tailored for each flyway component to minimize and preferably prevent crack propagation from the bondable material 132 into the cured fiber plies 104.

The pressurizable members 106 are preferably blow molded, TSVF or rotomolded thermoplastic materials with pressurizable inner chambers or volumetric regions 134. The pressurizable members 106 may be manufactured to have complex shapes, contours, and other features onto which the fiber plies 104 are arranged. Each pressurizable member 106 preferably includes at least one opening or sprue 130 to vent the hollow pressurizable member 106 to autoclave pressure or some other pressure "P." By pressurizing or venting the inner chamber 134, the pressurizable member 106 is urged against the un-cured fiber plies 104 to compress and sandwich the fiber plies 104 between the pressurizable member 106 and the mold 102. This ply compression operates to mitigate wrinkle formation in the flyway component. Because all members operate in unison and expand substantially uniformly the fiber plies are simultaneously placed in tension, which tends to minimize wrinkles in the produced component. In one embodiment, the pressurizable member may be produced from a chemically pure titanium tube in which the titanium tube is super plastically formed to create a metal matrix composite shape.

In one embodiment, the sprue 130 is used to introduce a pressure P into the chamber 134 that is greater than the autoclave pressure. After pressurizing and curing the fiber plies 104, the sprue 130 may vent gases built up in the chamber. By way of example, the sprue 130 may take the form of a fitting coupled to a fluid medium pump or other pressure source. In addition and depending on the arrangement of the assembly 108, the pressurizing and curing of the fiber plies 104 may be accomplished by pressurizing only the chambers 134 of the pressurizable members 106, thus eliminating the need for the bagging film 124 described in FIG. 1. In a preferred embodiment, impregnated (sometimes referred to as pre-impregnated) fiber plies 104 are arranged on the pressurizable member 106. The use of impregnated fiber plies may eliminate the step of injecting or infusing matrix material into the mold 102. In another embodiment, a resin transfer molding process is used to infuse resin into the fiber plies 104 and the pressurizable members 106 are pressurized without being placed in the mold 102.

In one embodiment, a plurality of pressurizable members 106 are coupled together to be in fluid communication with an adjacent pressurizable member 106 such that the fluid medium may flow freely into one of the pressurizable members 106 and simultaneously or contemporaneously pressurize all of the pressurizable members 106 that are in fluid communication with one another. One example of this embodiment is described above with reference to FIG. 1B.

The fiber plies 104 may be laid up or arranged with a 45 degree bias, which permits the pressurizable member 106 to considerably expand during the cure process. Preferably, the arrangement of the fiber plies 104 and the configuration of the pressurizable members 106 cooperate to ensure compression of all fiber plies 104 and thus prevent wrinkles during the cure process.

Instead of using "heavy" monolithic structures, the aerospace industry prefers that flight control surfaces, such as wing sections, be manufactured using "panelized honeycomb core" constructions. A panelized honeycomb core design is one where pre-cured ribs, skins, and spars are assembled using fasteners. The distinguishing feature from monolithic structure is that honeycomb or other core materials are used to stiffen the aerodynamic skins between the ribs and spars. This assembly process allows rib and spar spacing to greatly exceed the nine inch "rule of thumb" for monolithic structures. Sometimes the spacing between ribs and spars can exceed six feet. So, the total weight of ribs and spars is greatly reduced. Designers are constrained by the depth of the cavity when considering core thickness. If they cannot get the required core depth to minimize the number of plies, sometimes they achieve the design objective by maximizing the core depth and adding additional plies. It should be noted that core thickness increases the weight of the component, as well as do the ribs and fasteners and additional plies. So, optimization of the number of plies, ribs, and core thickness is a goal for efficient design that meets weight, strength, operational life and inspection requirements.

Figure 4:
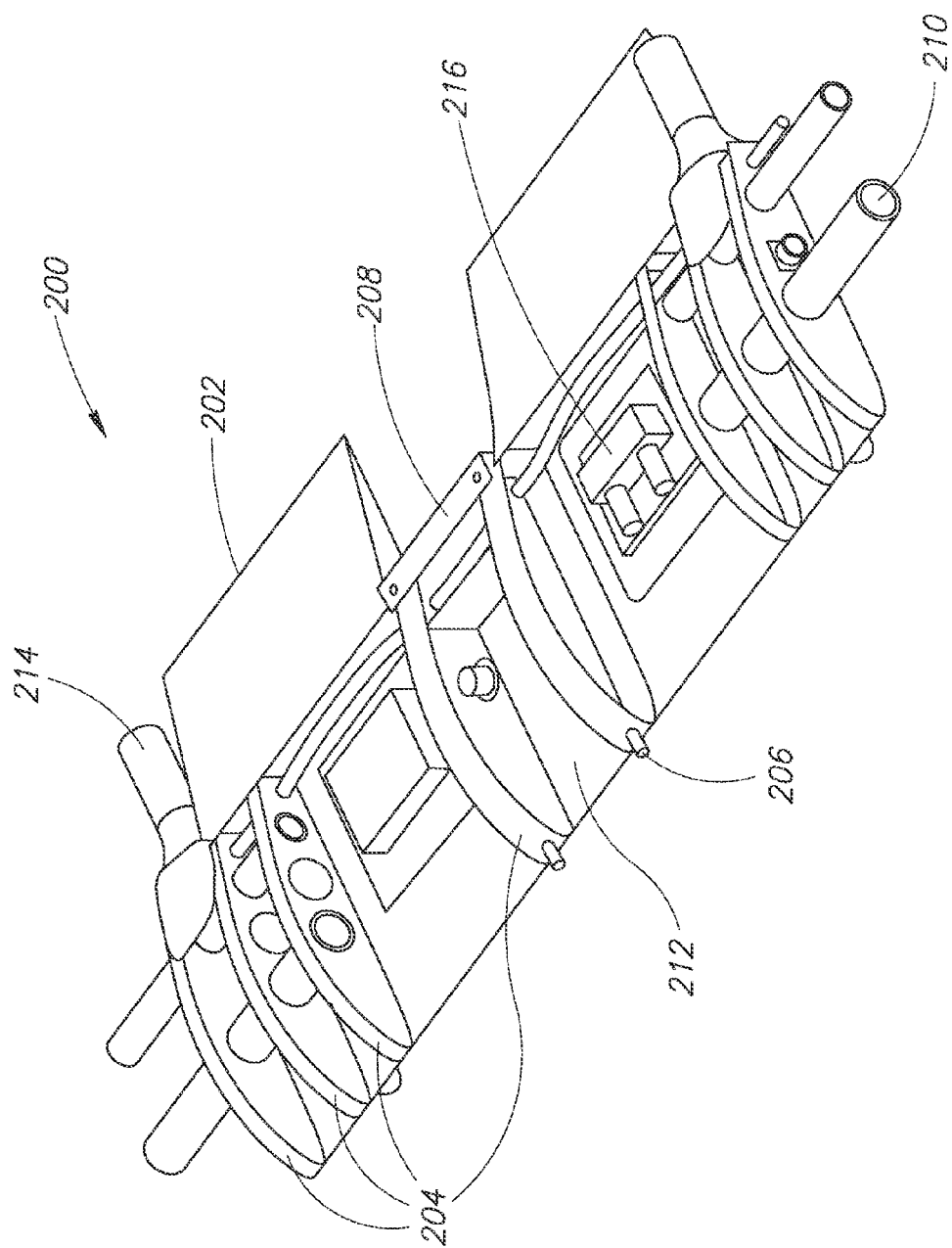
FIG. 4 is a perspective view of a composite structure according to an embodiment of the invention.

FIG. 4 shows a composite structure 200, with its top surface purposefully removed, taking the form of a wing section according to an embodiment of the present invention. The composite structure 200 may be made using the process described above with regard to FIGS. 1A-3. The composite structure 200 includes a trailing edge 202 having cored members (not shown) located between fiber plies of the trailing edge 202. The composite structure 200 also includes integral ribs 204. Further a forward attachment device 206 and a rear attachment device 208 are included for attaching the wing section to a fuselage (not shown) of an aircraft (not shown). The composite structure 200 may still further include one or more spar tubes 210, an oil tank 212, a boom attachment device 214 and an antenna 216.

Figure 5:
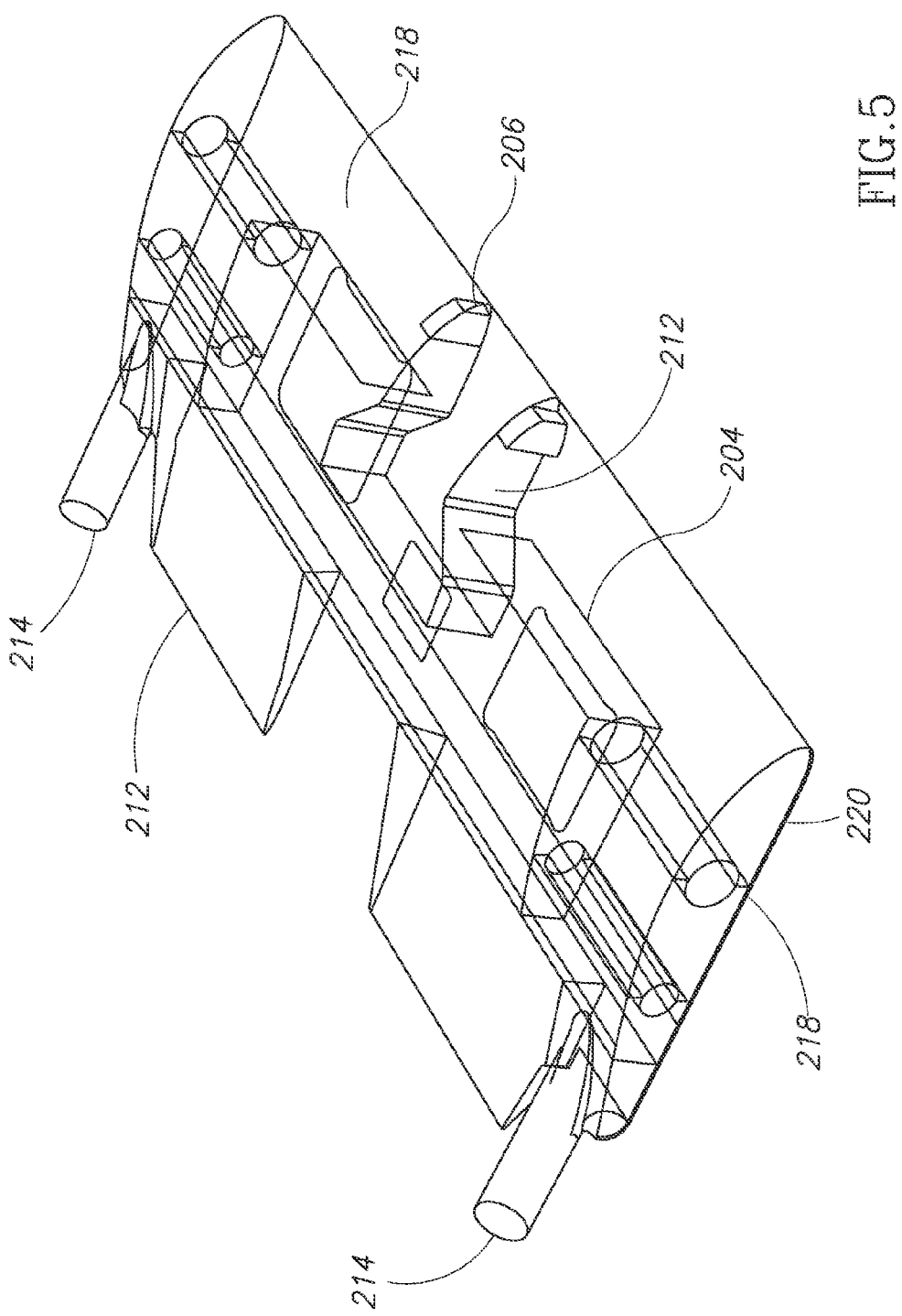
FIG. 5 is a perspective view of another composite structure according to another embodiment of the invention.

FIG. 5 shows a "see-through" version of the composite structure 200 of FIG. 4. In the illustrated embodiment, an upper wing section panel 218 and a lower wing section panel 220 may have cored members (not shown) embedded between respective fiber plies that comprise the panels 218, 220. In addition, the trailing edge panels 202 may have cored members (not shown) embedded therein. The embedded cored members will be shown and described in detail with respect to the upcoming drawings.

Figure 6:
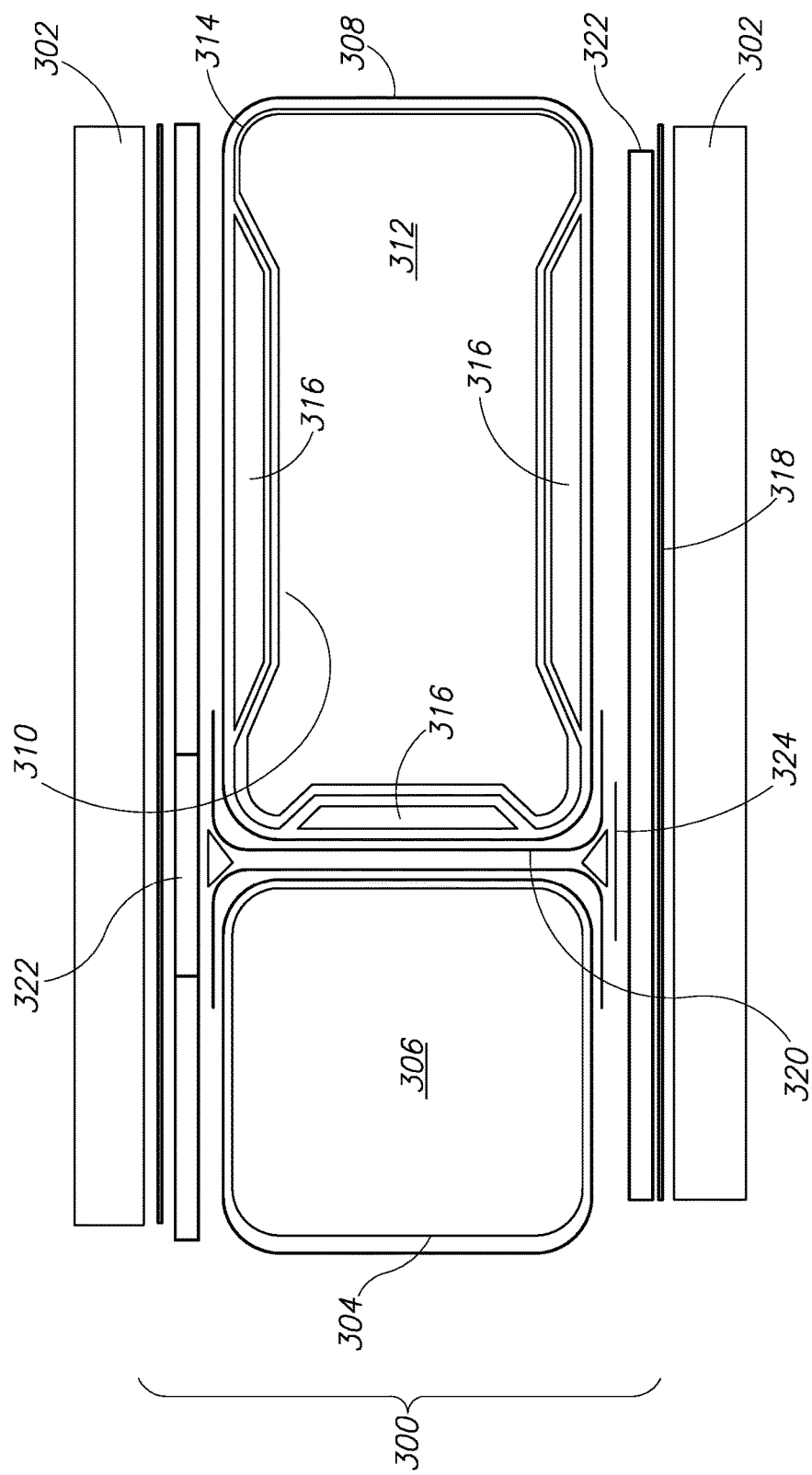
FIG. 6 is a side, cut-away view of a composite structure assembled in a tool according to an embodiment of the invention.

FIG. 6 schematically shows a composite assembly 300 located within a tool 302. The composite assembly 300 includes a first pressurizable member 304 having a pressurizable interior region 306. The composite assembly 300 further includes a second pressurizable member 308 having recessed portions 310 and a pressurizable interior region 312. In one embodiment, the recessed portions 310 are formed when the pressurizable member 308 is molded or otherwise created.

Further during the lay-up process of the composite assembly 300 within the tool, a first plurality of fiber plies 314, which may take the form of a fabric layer or layers, are laid onto the pressurizable member 308 and are either forced to conform (e.g., by pressing and manipulating) or permitted to conform (e.g., by gravity), to the recessed portions 310 and then cored members 316 are placed, respectively, onto the recess-conformed fiber plies 314 and seated into the recessed portions 310. At that point, another layer of fiber plies 318 are placed onto the cored members 316 to form a composite assembly. In the illustrated embodiment, the cored member 316 adjacent a rib 320 may operate to stiffen the rib 320, which would minimize or eliminate buckling of the rib 310 during crushing loads. In addition, the cored members 316 on the top and bottom of the assembly, respectively, may operate to stiffen the panels and prevent them from buckling under compression loading scenarios.

In some instances, it may be desirable to stiffen the entire skin of a composite assembly. As such, additional cored members 316 may be added at other locations. Optionally, solid laminate plies 322 may be added adjacent to the rib 320 to prevent peeling or shear loads from causing core delamination. If solid laminate plies are not used, then optionally bridge plies 324 may be used to keep the cored member 316 from deforming into the radius during cure operations. While the illustrated embodiment shows three cored members 316, it is understood that a fewer or lesser number of cored members may be used to selectively stiffen various regions of the composite assembly.

Advantageously, the above-described composite structure manufacturing process may eliminate the bagging operations that are commonly required during autoclave processes. Additionally, the pressurizable members 304 are more stable and robust than bagging materials and their tolerances may be precisely controlled. Accordingly, the pressurizable members used with one or more cored members may prevent existing processing problems, such as "core crush" from occurring. In one embodiment, this advantage may be enhanced by increasing a chamfer angle 514 (FIG. 12) of the cored member along one or more edges. At least in some composite structures, a steeper chamfer angle 514 (FIG. 10) may result in a lighter part because it effectively stiffens the panel closer to the rib 320 (FIG. 6).

Figure 7A:
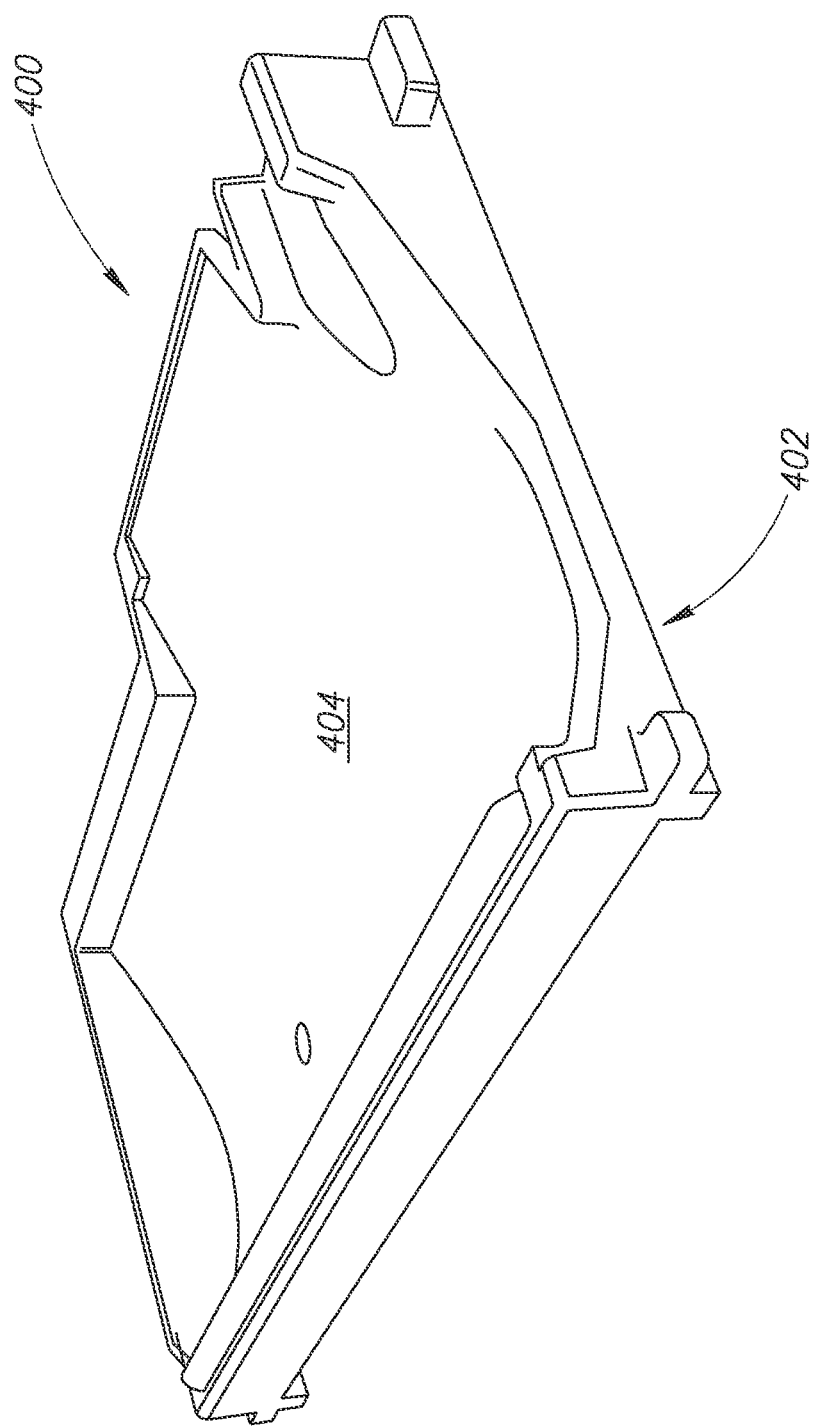
FIG. 7A is a perspective view of a bottom tool for assembling a composite structure according to an embodiment of the invention.
Figure 8:
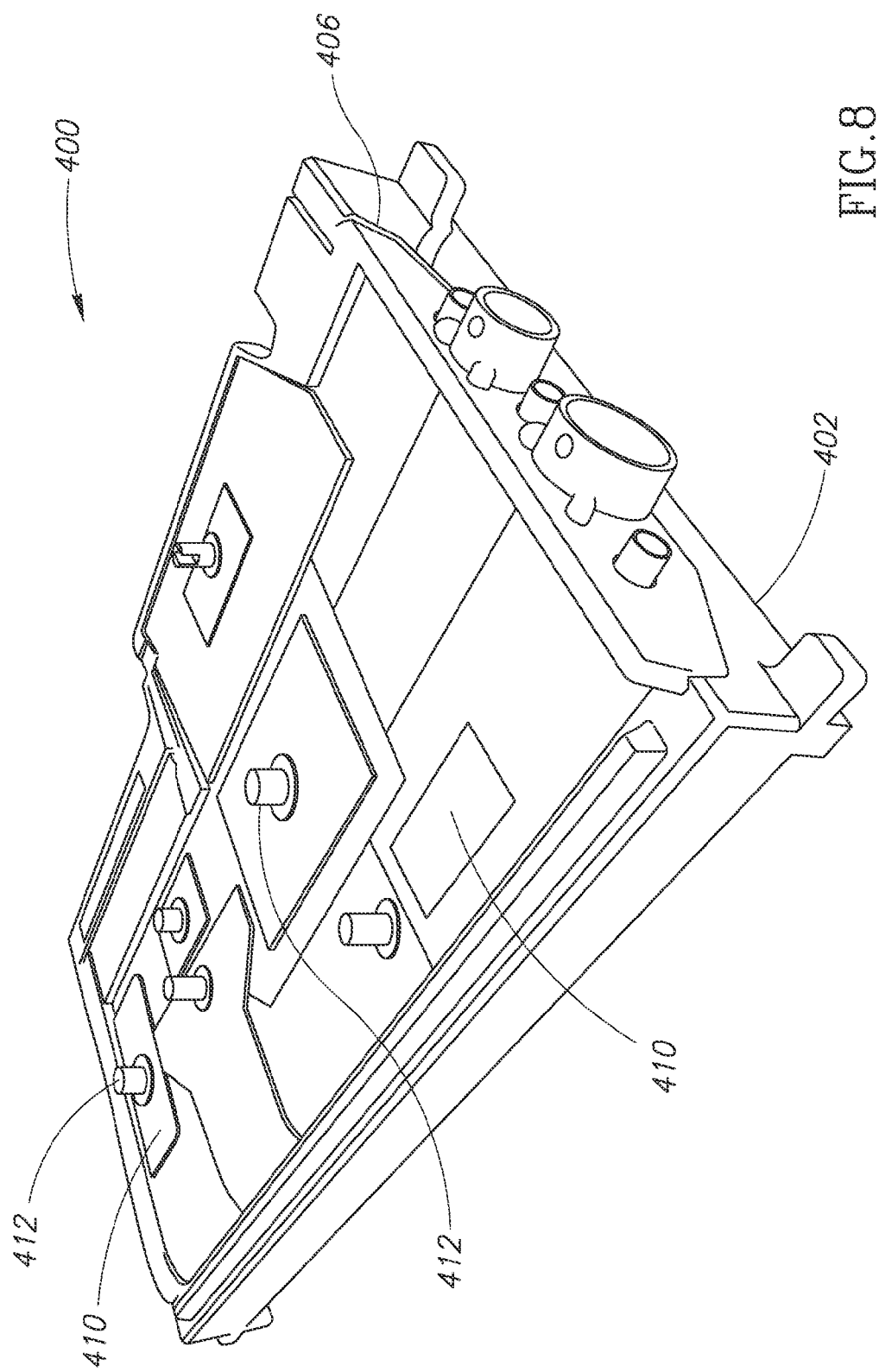
FIGS. 8 and 9 are perspective views of a plurality of pressurizable members selectively arranged onto fiber plies that are laid onto the bottom tool of FIG. 7A according to an embodiment of the invention.

FIGS. 7A-9 briefly show an assembly process 400 for configuring a composite structure or assembly according to an embodiment of the present invention. FIG. 7A shows a bottom tool 402 with a tool support surface 404. FIG. 7B shows an upper tool 406 having a plurality of cavities 408 configured to receive pressurizable members 410 (FIG. 8).

Figure 9:
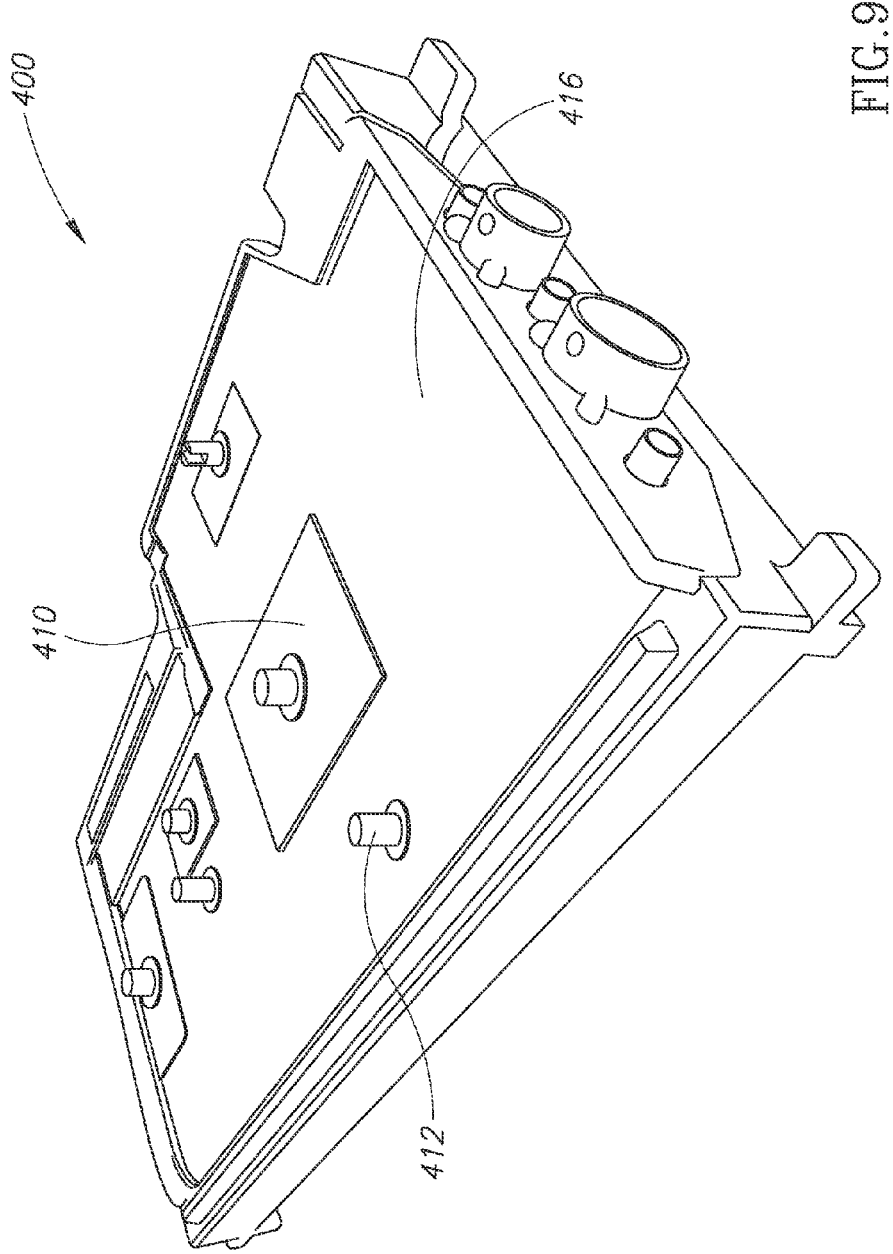

FIG. 8 shows a plurality of pressurizable members 410 arranged onto fiber plies, which are arranged beneath the pressurizable members 410. At least some of the pressurizable members 410 have external sprues or ports 412 for communicating with a pressure source (not shown). FIG. 9 shows one or more fiber ply sheets 416 placed onto the pressurizable members 410 while still permitting the external ports 412 to remain visible. The illustrated assembly shows the composite structure before the pressurizing and curing processes.

Figure 10:
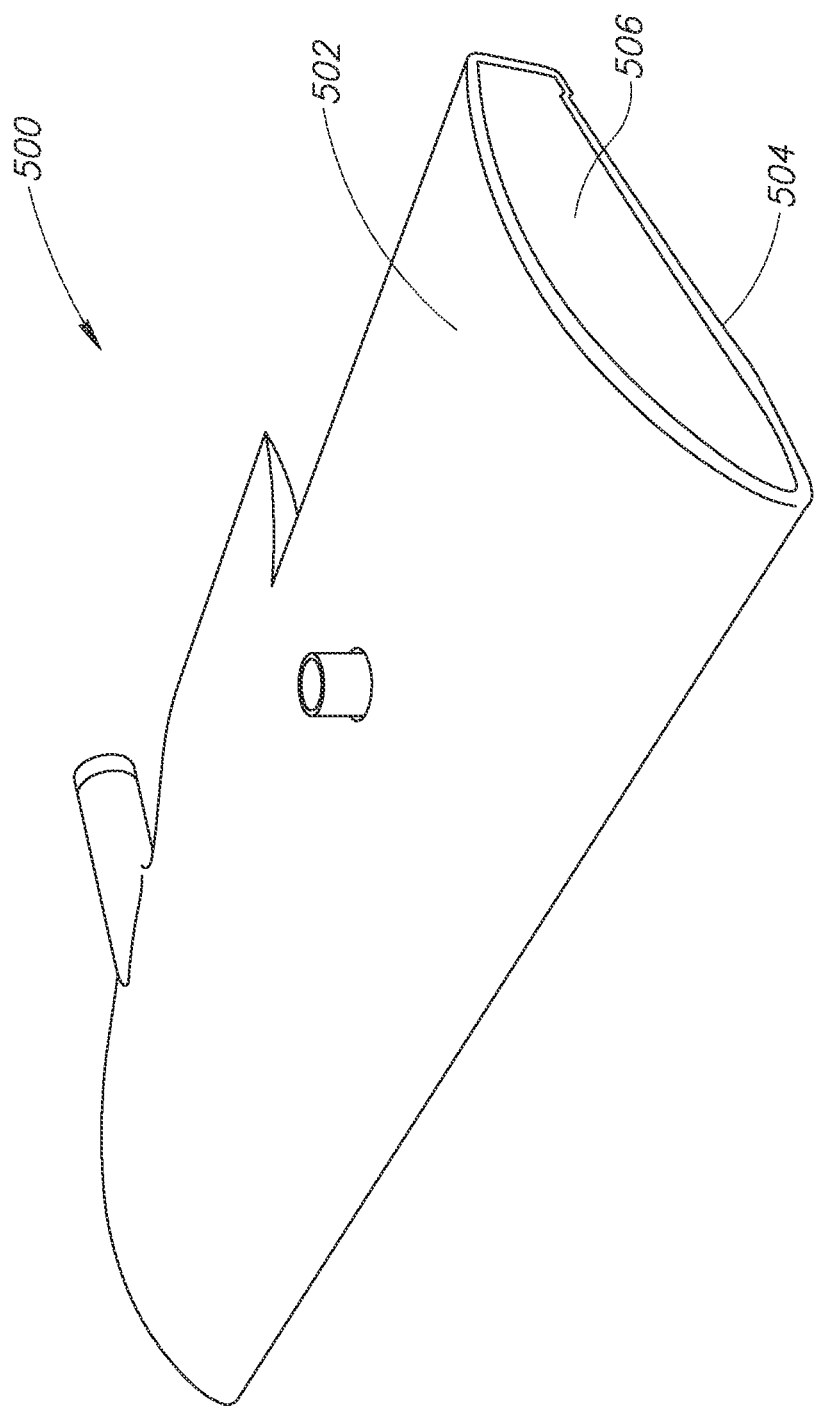
FIG. 10 is a perspective view of a composite structure, with pressurizable members still located within the structure, made in accordance with an embodiment of the invention.

FIG. 10 shows a composite structure 500, which takes the form of a wing section, made according to the above-described assembly process after the pressurizing and curing processes. The composite structure 500 includes a top surface 502 and a bottom surface 504 that have been compacted by the counteracting pressures, as previously described. As illustrated, the pressurizable members 506 have not yet been removed from the composite structure 500.

Figure 11:
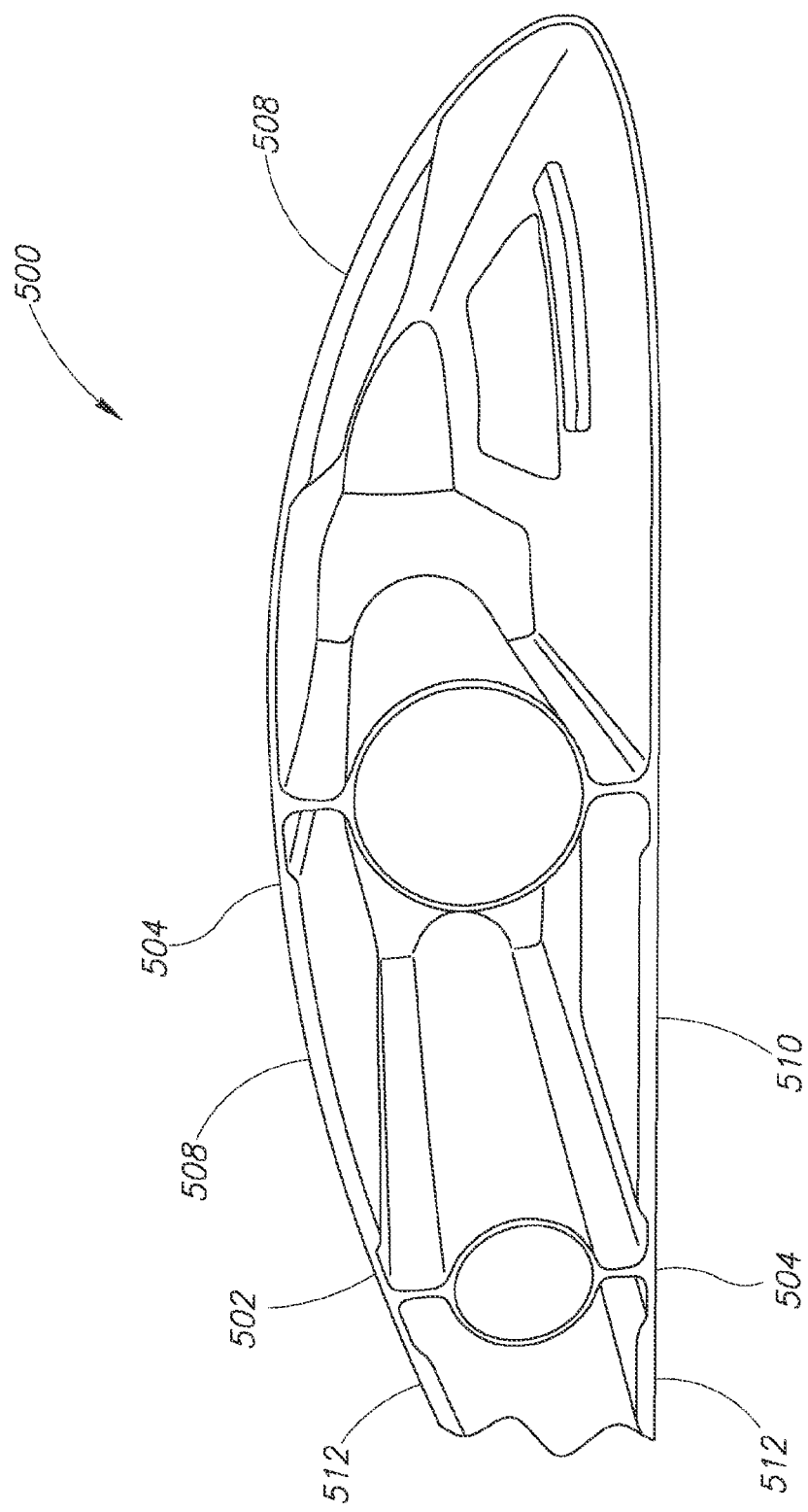
FIG. 11 is a perspective view of the composite structure of FIG. 10 with the pressurizable members removed according to an embodiment of the invention.

FIG. 11 shows a cross-sectional cut of the composite structure 500 after the pressurizable members 506 (FIG. 10) have been removed. The composite structure 500 includes embedded, cored members, specifically two upper surface cored members 508, a lower surface cored member 510, and respective upper and lower trailing edge cored members 512.

FIGS. 12A through 18 show an exemplary embodiment of manufacturing a fiber-reinforced composite wing section with embedded and/or integrated mechanical features. By way of example, the mechanical features may provide attachment points through a composite skin and primary or alternate structural load paths through the composite wing section. Although a wing section is described herein, it is appreciated that the composite structure may take many forms in a variety of environments and applications.

Figure 12A:
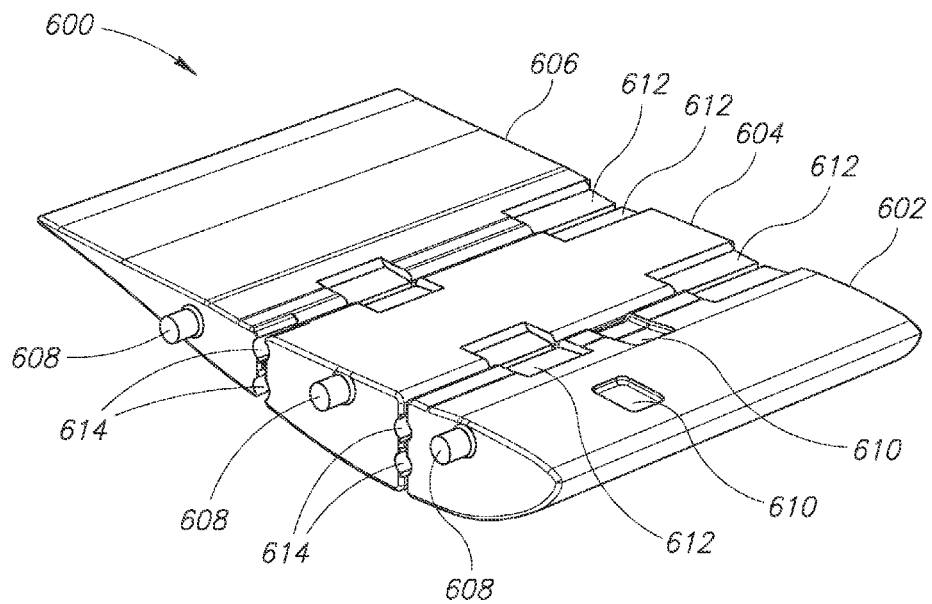
FIG. 12A is a top, left, perspective view of a pre-assembled wing section having custom-formed pressurizable members configured to receive various mechanical features according to an embodiment of the present invention.
Figure 12B:
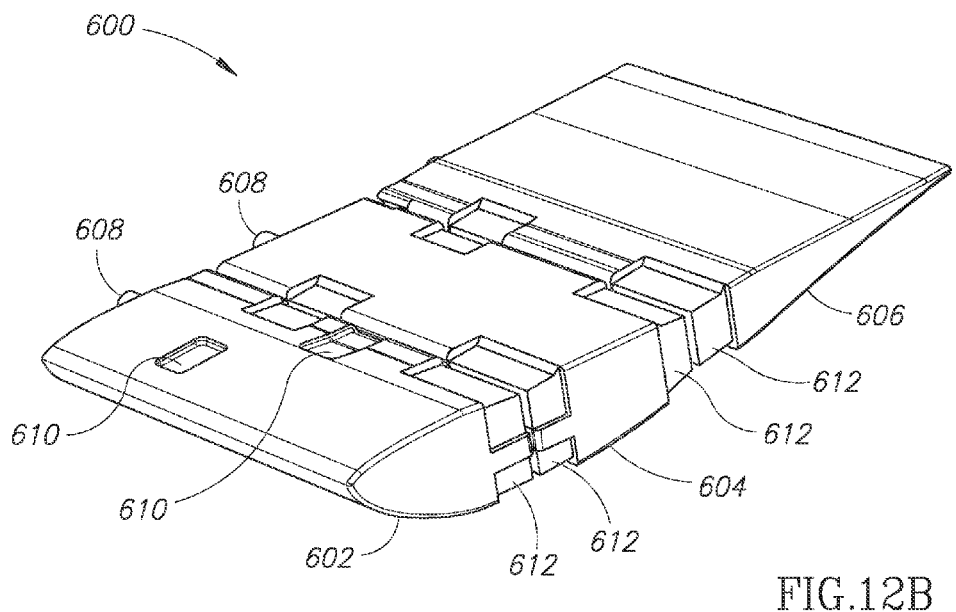
FIG. 12B is a top, right, perspective view of the pre-assembled wing section of FIG. 12A.

FIGS. 12A and 12B show wing section 600 in an initial assembly and manufacturing phase. In the illustrated embodiment, the wing section 600 includes three custom-shaped pressurizable members, a leading edge member 602, a center member 604 and a trailing edge member 606, respectively. Each of the pressurizable members 602, 604 and 606 include sprues or pressure ports 608. By way of example, the leading edge member 602 includes integrally formed recesses such as, but not limited to, bearing or backing plate recesses 610, fitting recesses 612 and diametric recesses 614, each of which will be explained in more detail below. As illustrated, the center member 604 and the trailing edge member 606 may also include such recesses. The backing plate recesses 610 may be molded into the pressurizable members to provide location capability As noted above, each pressurizable member may take the form of a hollow rotomolded thermoplastic member, a blow molded thermoplastic member, a super-plastic formed metallic member, a twin sheet vacuum formed member (TSVF), or a three-dimensionally printed thermoplastic member.

Figure 13:
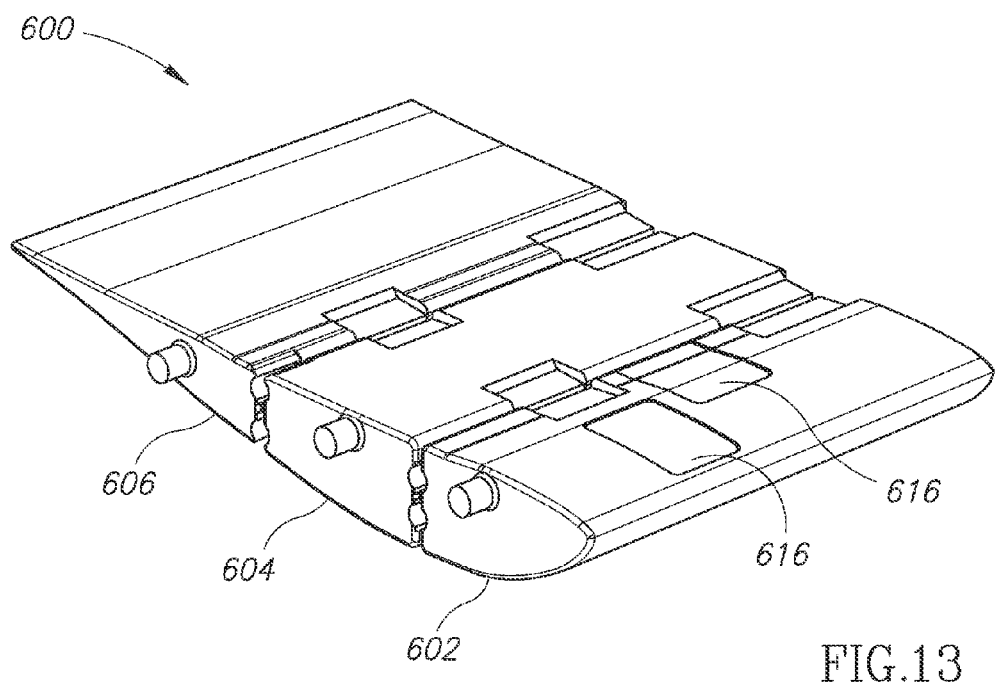
FIG. 13 is a top, left, perspective view of a partially assembled wing section with bearing plates installed according to an embodiment of the present invention.

FIG. 13 shows the wing section 600 with bearing or backing plates 616 placed onto the bearing plate recesses (covered by the bearing plates 616 in the illustrated embodiment). In one embodiment, the backing plates 616 may be made from aluminum, anodized and then wrapped with a fiber-reinforced composite material, such as fiberglass, to prevent corrosion. Wrapping the backing plates 616 may help reduce peel of the fiber plies comprising the wing section 600 the backing plates 616 are structurally loaded.

Figure 14:
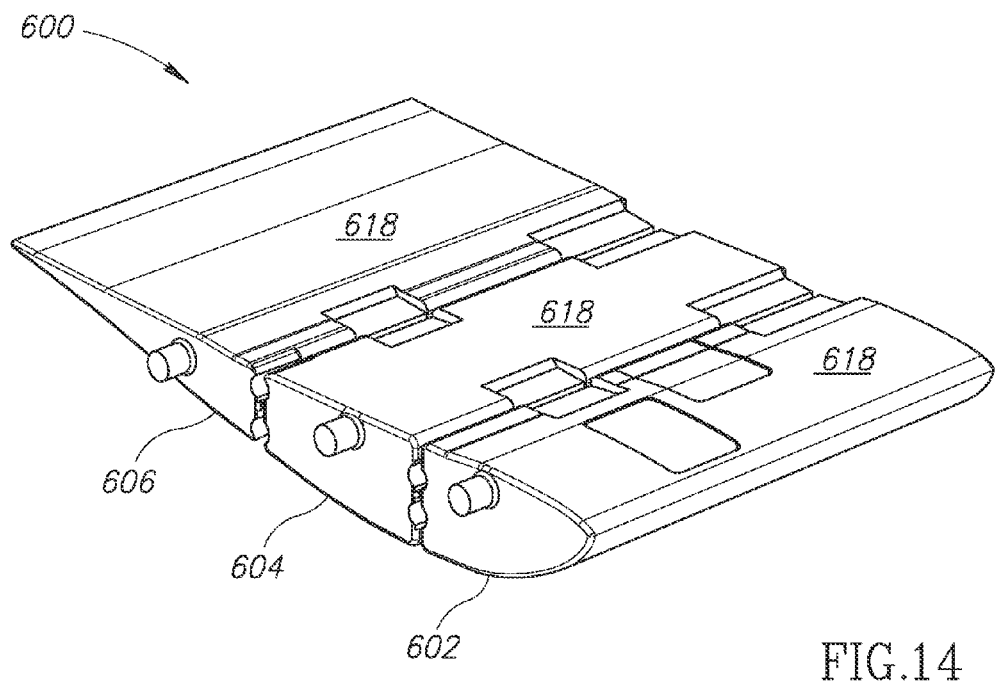
FIG. 14 is a top, left, perspective view of the partially assembled wing section of FIG. 13 wrapped with at least one layer of fiber plies according to an embodiment of the present invention.

FIG. 14 shows the pressurizable members 602, 604 and 606 wrapped with one or more layers of fiber plies 618 in which the fiber plies 618 are placed onto the surfaces of the pressurizable members and cover the bearing plates.

Figure 15A:
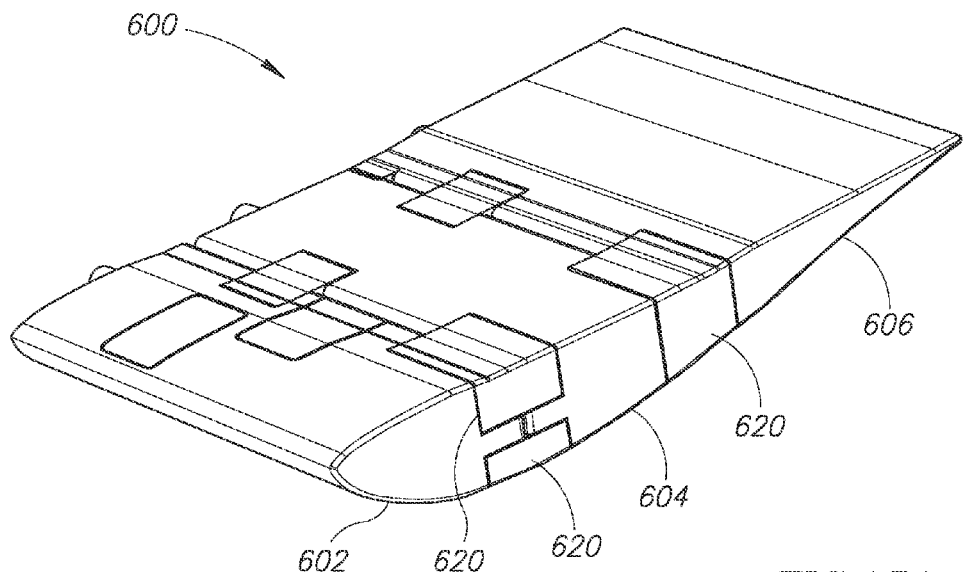
FIG. 15A is a top, right perspective view of the partially assembled wing section of FIG. 14 with additional mechanical features installed according to an embodiment of the present invention.
Figure 15B:
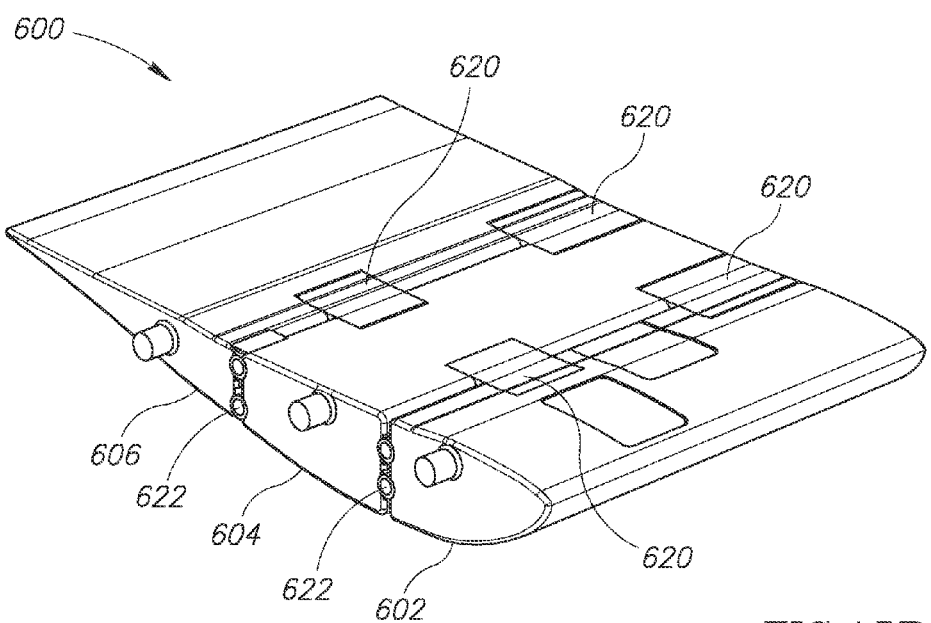
FIG. 15B is top, left perspective view of the partially assembled wing section of FIG. 15A.

FIGS. 15A and 15B show complex-shaped mechanical features integrated between the pressurizable members. In the illustrated embodiment, the mechanical features take the form of T-shaped mechanical features 620 and threaded inserts 622.

In the illustrated embodiment, the upper and lower T-shaped mechanical features may have webs that are mechanically joined or integrally formed. In such an instance, the joined web may not allow the internal pressure of the pressurizable members to urge the mechanical features and fiber plies against the tool during a curing operation. Nevertheless, the mechanical features may still be sufficiently encapsulated by adjusting the pressure of the mold.

Figure 16:
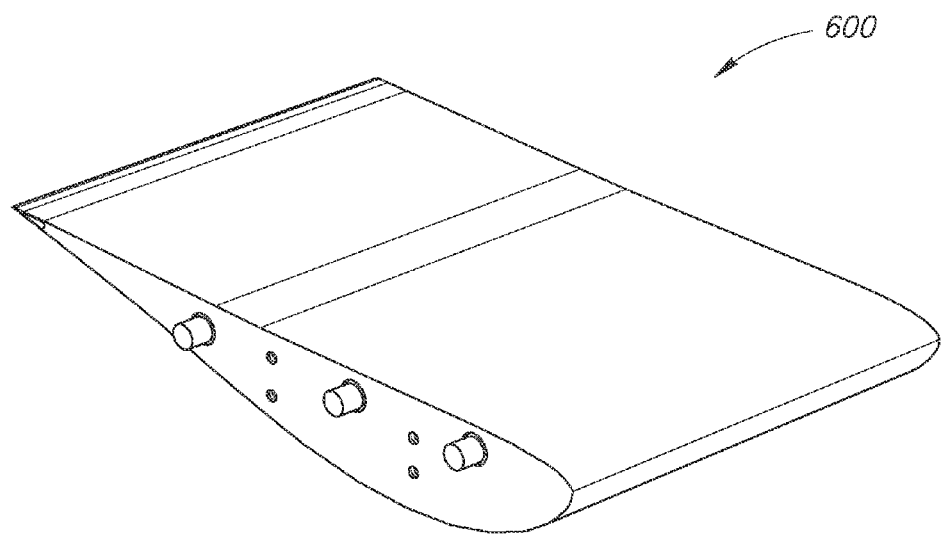
FIG. 16 is top, left perspective view of an assembled, pre-cured wing section according to an embodiment of the present invention.
Figure 17:
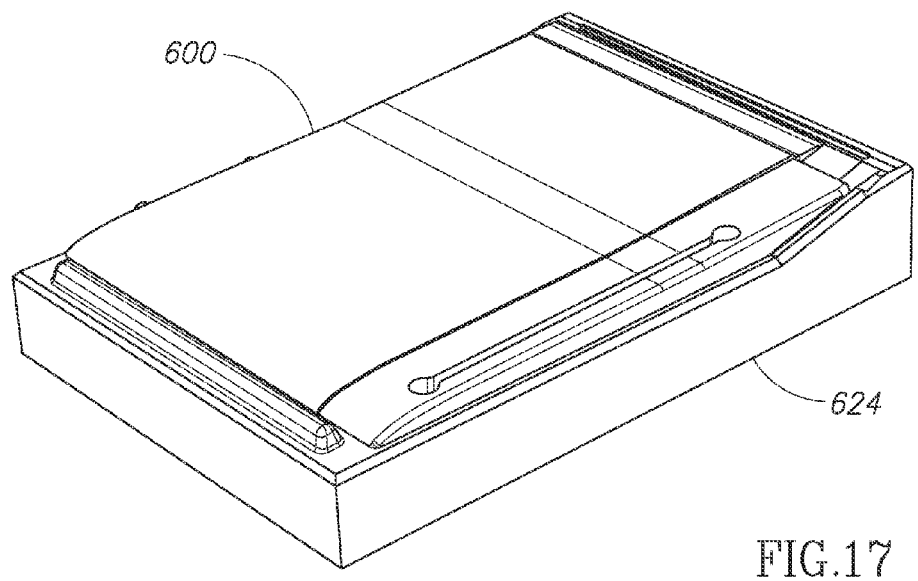
FIG. 17 is a top, right perspective view of the assembled, pre-cured wing section of FIG. 16 placed on a bottom portion of a mold according to an embodiment of the present invention.
Figure 18:
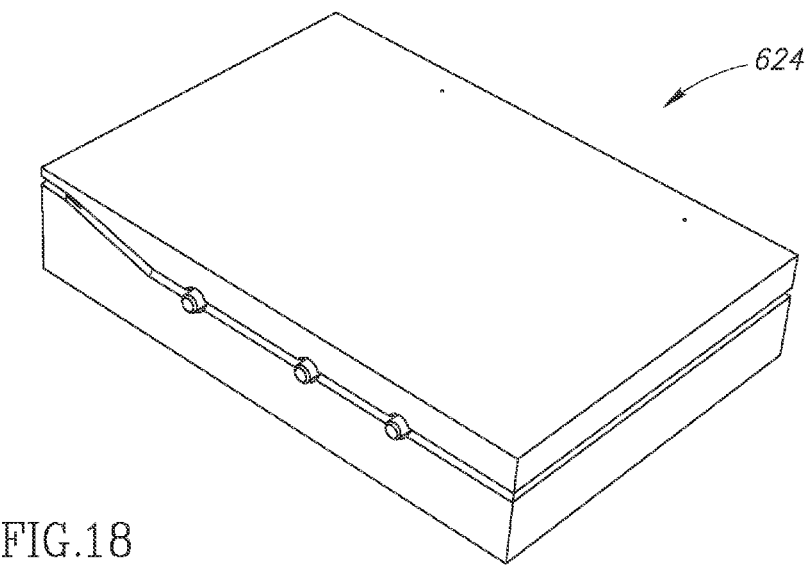
FIG. 18 is a top, left perspective view of the assembled, pre-cured wing section of FIG. 16 encapsulated by a mold according to an embodiment of the present invention.

FIG. 16 shows the wing section 600 fully wrapped with at least one more layer of fiber plies to cover the mechanical features. FIGS. 17 and 18 show the mold or tool 624 configured to receive the wing section 600. The tool 624 may be placed into an autoclave for a curing operation. While in the autoclave, an outer surface 626 of the wing section 600 may pressurized while the pressurizable members are internally pressurized via the sprues 608 (FIG. 12A). The arrangement of the mechanical features and stepwise buildup of the fiber plies permits pressure to react on all surfaces during the curing operation to encapsulate, embed and/or integrate the mechanical features with the fiber-reinforced composite material.

The internal pressure urges the pressurizable members against each other, against the tool and against the mechanical features, which are sandwiched between the fiber plies adjacent the pressurizable members and the fiber plies adjacent the tool. This encapsulation securely embeds the mechanical features while providing sufficient fiber/resin compaction to preferably create a "void free" composite structure or assembly or at least appreciably diminish any voids. Minimizing or eliminating voids may advantageously prevent peeling of the fiber plies, which is a common form of joint failure in composite structures.

The process described and illustrated in FIGS. 12A-18 may be utilized to advantageously apply uniform pressure to all sides of the mechanical features within the composites structure or assembly, which in turn may advantageously permit direct and predictable load paths and/or load transfer regions, especially in areas of tension, compression or shear.

Figure 19A:
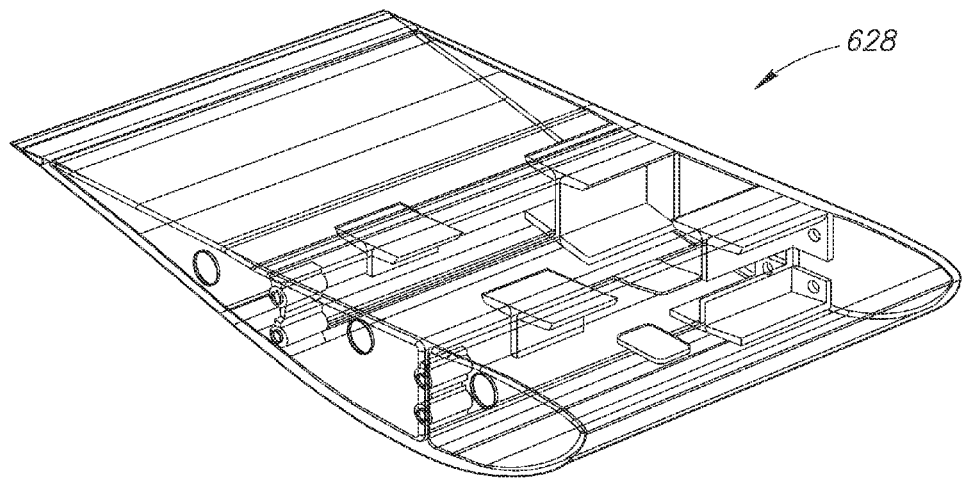
FIG. 19A is a top, left perspective view of a finished wing section with the skins purposefully made transparent to show the embedded or encapsulated mechanical features within the wing section according to an embodiment of the present invention.
Figure 19B:
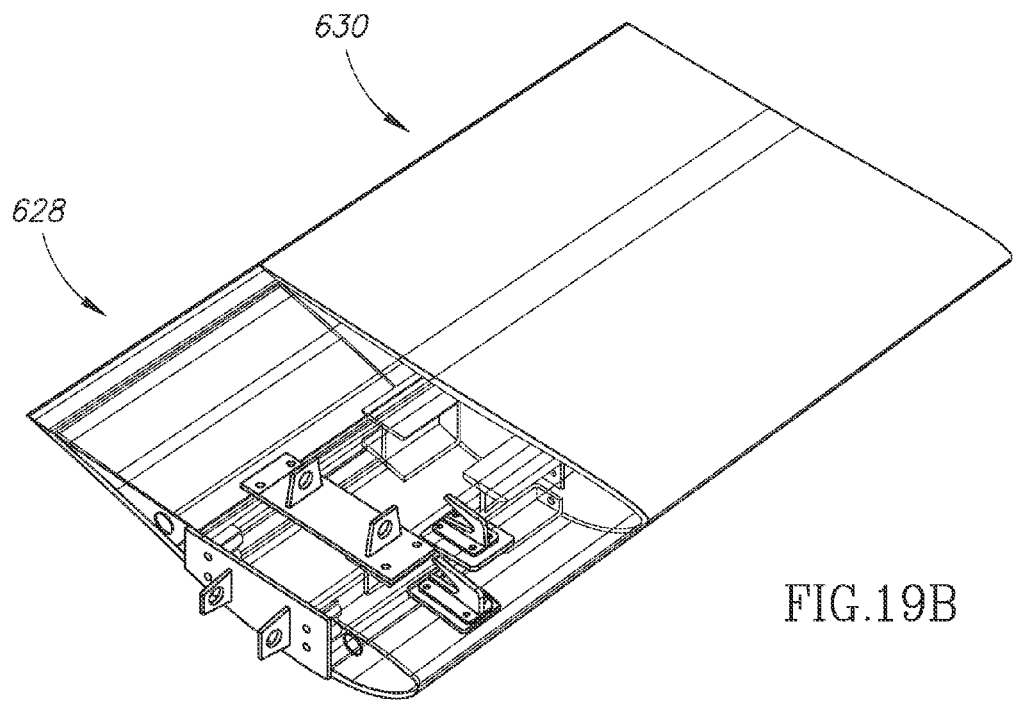
FIG. 19B is a top, left perspective view of the finished wing section of FIG. 19A coupled to another wing section according to an embodiment of the present invention.

FIG. 19A shows a finished wing section 628 with the embedded mechanical features. For purposes of clarity and to show the arrangement of the internal mechanical features, the outer fiber plies are shown as transparent. Likewise, FIG. 19B shows the finished wing section 628 joined to another finished wing section 630.

Figure 20:
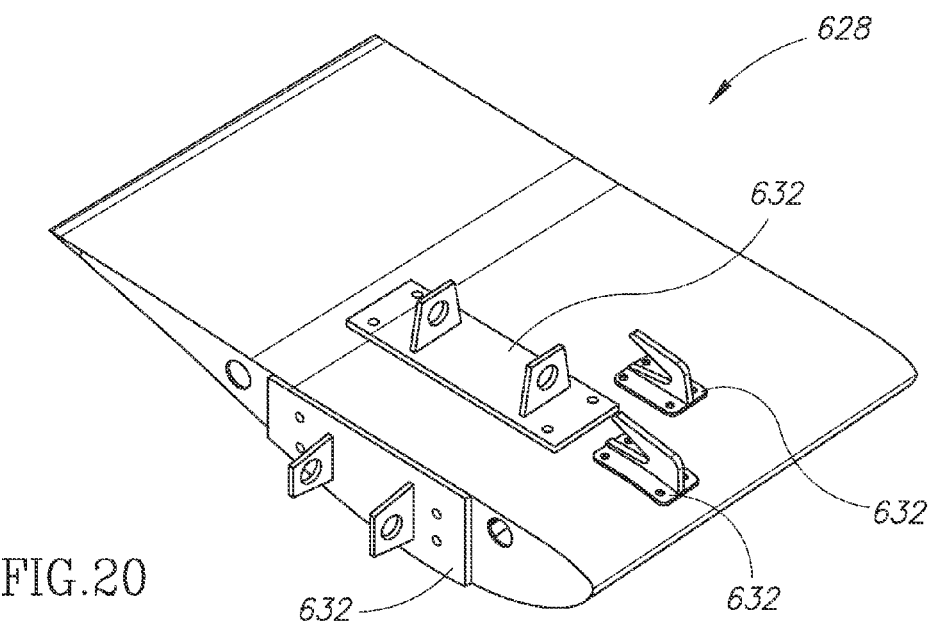
FIG. 20 is a top, left perspective view of a finished wing section with external fittings attached thereto according to an embodiment of the present invention.

FIG. 20 shows the finished wing section 628 with various exterior fittings 632 that are fastened to or otherwise mechanically coupled to the embedded mechanical features best shown in FIG. 19A.

Figure 21:
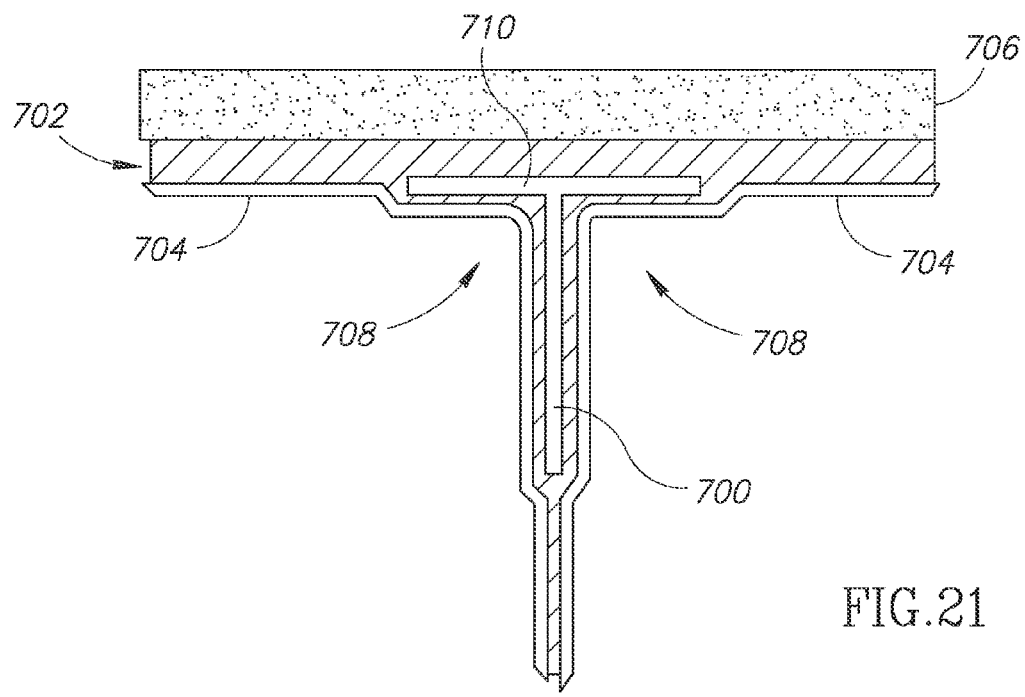
FIG. 21 is a cross-sectional view of a composite assembly having a T-shaped mechanical feature embedded therein according to an embodiment of the present invention.

FIG. 21 shows a T-shaped mechanical feature 700 embedded or encapsulated within fiber plies 702, which in turn are arranged between pressurizable members 704 and a mold 706. In one embodiment, the internal and external pressures may be selected and/or adjusted to minimize or eliminate the potential for delaminated areas along the outer mold line (OML) of the mold 706 in the region around the T-shaped mechanical feature 700. In addition, the pressurizable members 704 may be configured with a cusp or recess 708 to receive the cap 710 of the T-shaped mechanical feature 700 while providing for a sufficient number of plies and sufficient curing tolerances between the cap 710 and the mold 706. In the illustrated embodiment, the cusp 708 operates to react pressure from the pressurizable members to cause the resin and fiber plies to compact more in the center of the cap 710 than at its edges. Such a configuration may advantageously cause a slight amount of resin to flow outward and fill void areas between the center and edge of the cap 710.

It should be noted that if the cusp 708 is too deep then excess resin flow may cause a pinching condition in the fiber plies 702 proximate the cap 710. Pinched conditions cause excess resin migration, and a dry, weak spot will occur at its location. As shown in the finished wing section 628 of FIG. 19A, the T-shaped mechanical feature 700 may function to transfer loads through a rib or spar to another portion or region of the composite structure. By way of example, the T-shaped mechanical feature 700 may be used on composite structures such as, but not limited to, landing gear door actuators, ailerons, passenger doors, wing sections, stabilizer sections, rudders, etc.

Figure 22:
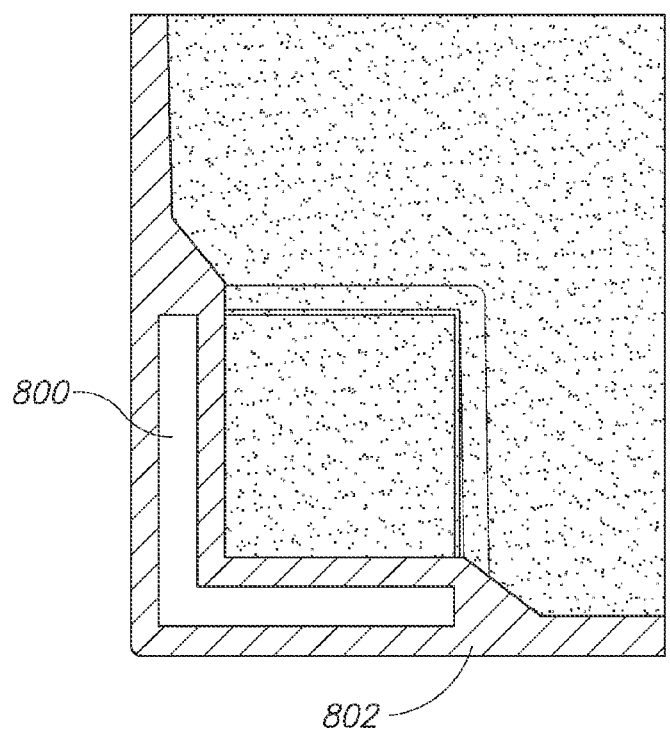
FIG. 22 is a cross-sectional view of a composite assembly having an angle-shaped mechanical feature embedded therein according to an embodiment of the present invention.

FIG. 22 shows an angle fitting 800 embedded or encapsulated within fiber plies 802 according to another embodiment of the present invention. Angle fittings may carry loads through ribs from an upper wing surface to a lower wing surface or vice-versa. Examples of where the angle fitting may be employed are a trailing edge flap, a spoiler, a passenger door or a landing gear door.

Figure 23:
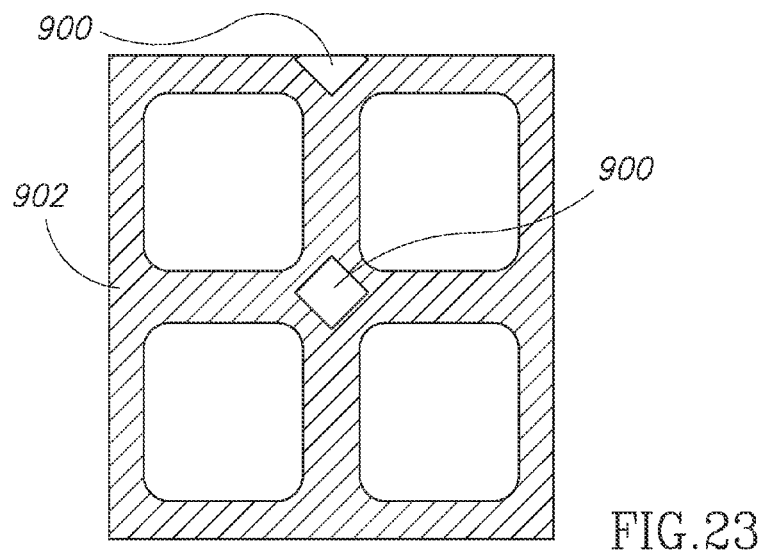
FIG. 23 is a cross-sectional view of a composite assembly having an fillet sections embedded therein according to an embodiment of the present invention.

FIG. 23 shows fillet sections 900 embedded or encapsulated within fiber plies 902 according to another embodiment of the present invention. Fillet sections 900 may be used to provide structural rigidity while being relatively light weight and causing a minimal impact to the design of the overall composite structure.

Figure 24A:
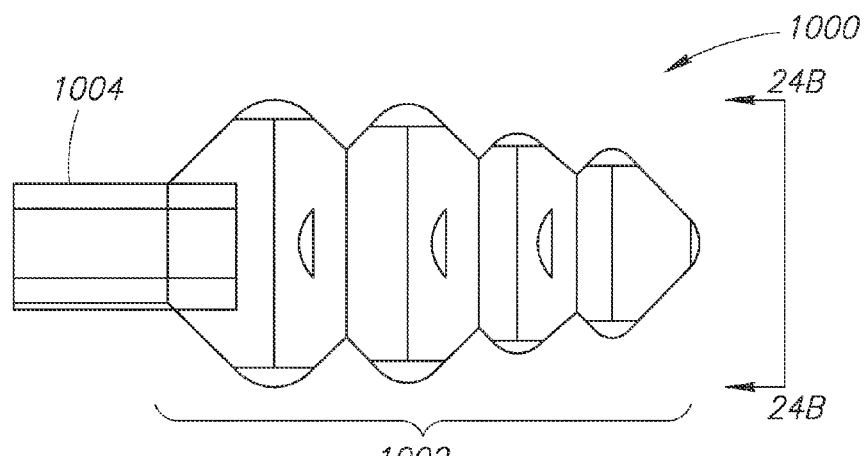
FIG. 24A is a side, elevational view of a complex-shaped mechanical feature according to an embodiment of the present invention.
Figure 24B:
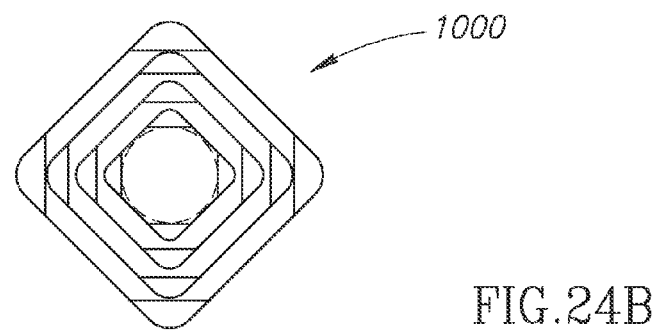
FIG. 24B is an end view of the complex-shaped mechanical feature of FIG. 24A.

FIGS. 24A and 24B shows a multi-faceted (e.g., complex-shaped) fastening device or fillet device 1000 that may be embedded or encapsulated in a composite structure according to an embodiment of the present invention. In the illustrated embodiment, the fastening device 1000 includes successive, tapered features 1002 and a stud portion 1004, which may or may not be internally threaded. The tapered features 1002 may increase the torque capability as well as the pull out strength of the device 1000. The tapered features 1002 may take a variety of shapes or configurations such as, but not limited to, spherical, elliptical, rectangular, triangular, etc.

Figure 25:
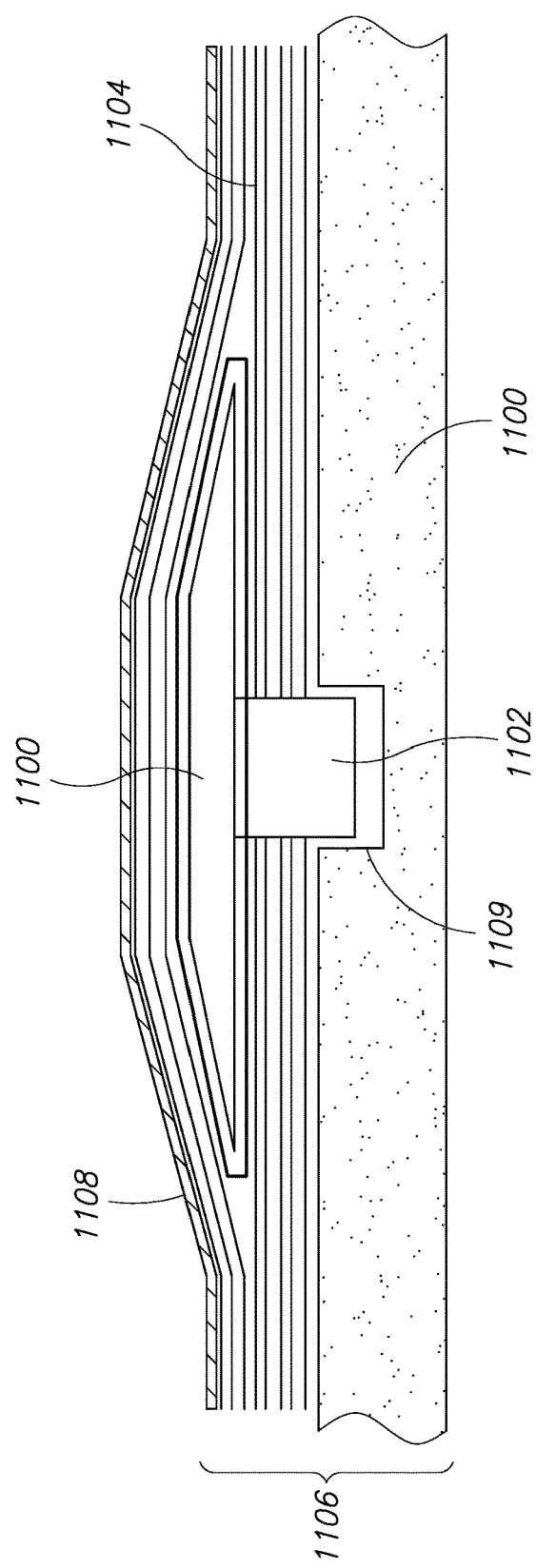
FIG. 25 is a cross-sectional view of a composite assembly having a mechanical feature with an indexing stud according to an embodiment of the present invention.

FIG. 25 shows a mechanical feature 1100 integrally formed with or coupled with a locating pin or stud 1102. In one embodiment, the stud 1102 protrudes through a plurality fiber ply layers 1104 such that an assembly 1106 comprising at least one pressurizable member 1108, the mechanical feature 1100 and the fiber ply layers 1104 may be indexed to an indexing port or recess 1109 formed in a tool or mold 1110. In the illustrated embodiment, the indexing recess 1108 is of sufficient depth that the stud 1102 does not bottom out during the pressurization/cure operation. Optionally, the stud 1102 may include internal or external threads. The mechanical feature 1100 may be made from such as, but not limited to, a metallic material, a pre-cured composite material, or a plastic material. The stud 1102 may advantageously permit the assembly 1106 to be accurately indexed and located relative the tool 1110.

Figure 26A:
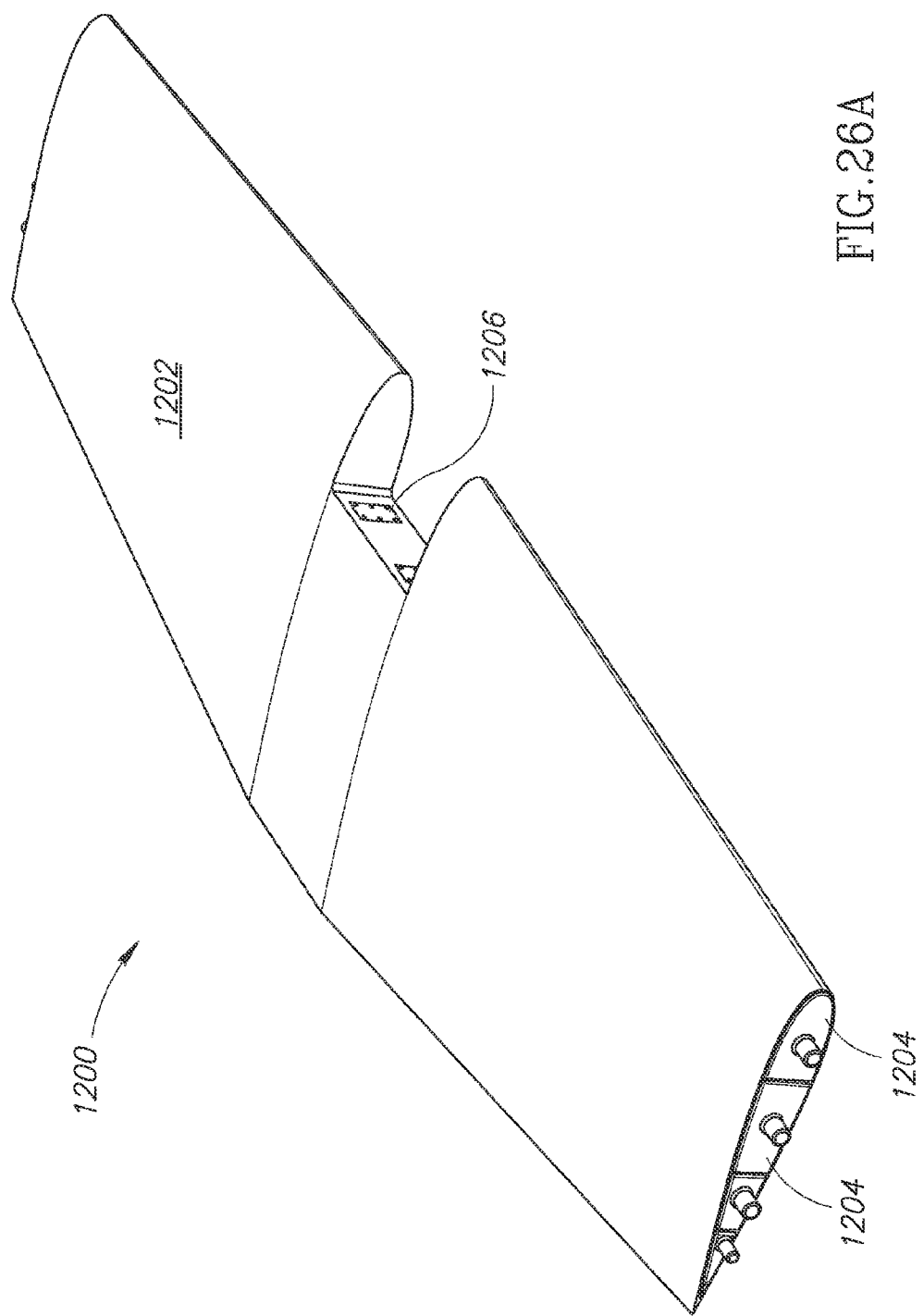
FIG. 26A is a top, right, perspective view of a pre-cured stabilator with pressurizable members and embedded mechanical features according to an embodiment of the present invention.
Figure 26B:
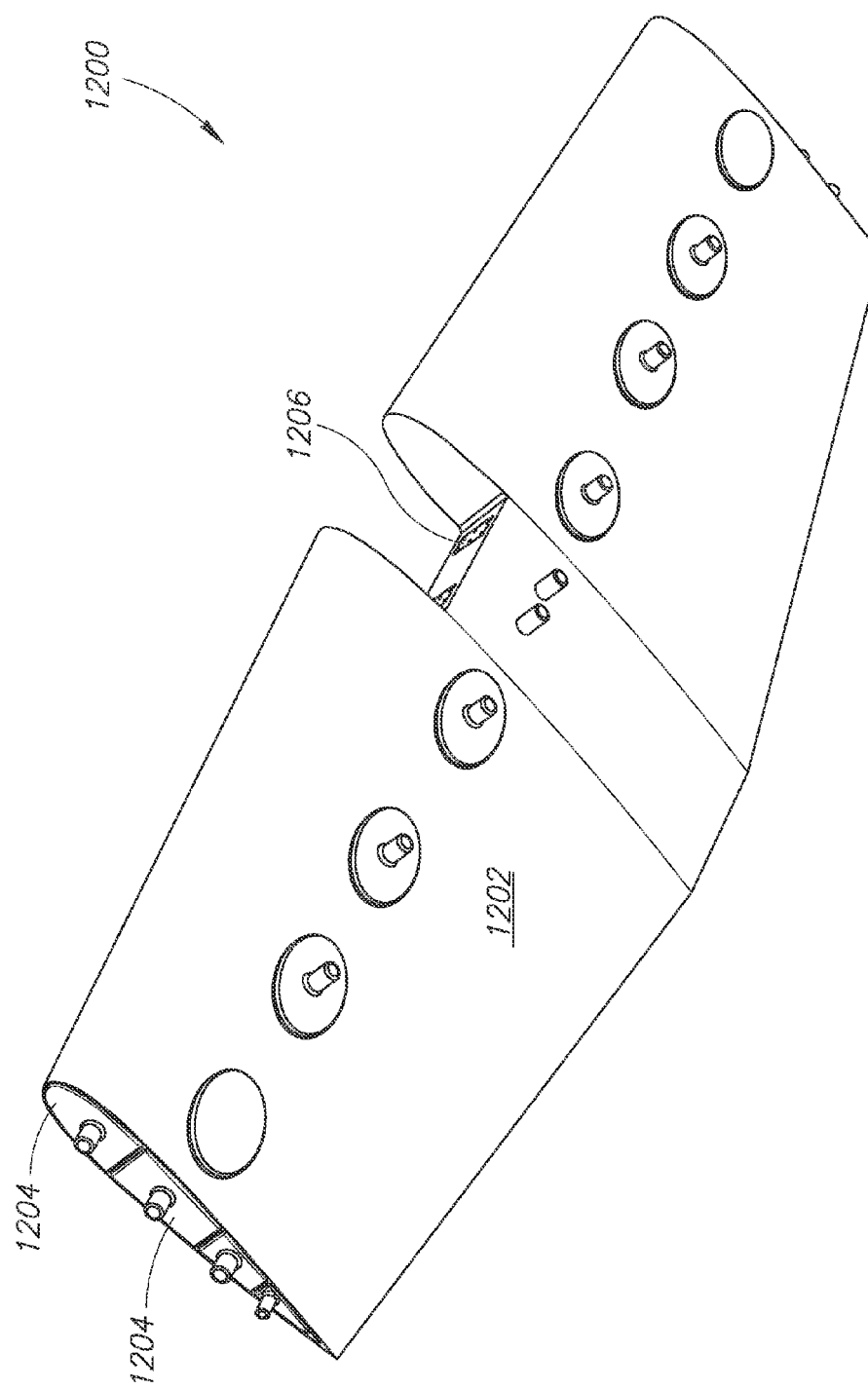
FIG. 26B is a bottom, right perspective view of the pre-cured stabilator of FIG. 26A.

FIGS. 26A and 26B show a pre-cured composite stabilator 1200 made in accordance with one or more processes described herein. The stabilator 1200, which may be referred to a fully movable stabilizer for flight vehicle, includes a fiber-reinforced composite skin 1202, a plurality of pressurizable members 1204 and at least one embedded or encapsulated mechanical feature 1206 incorporated into the stabilator 1200.

Figure 26C:
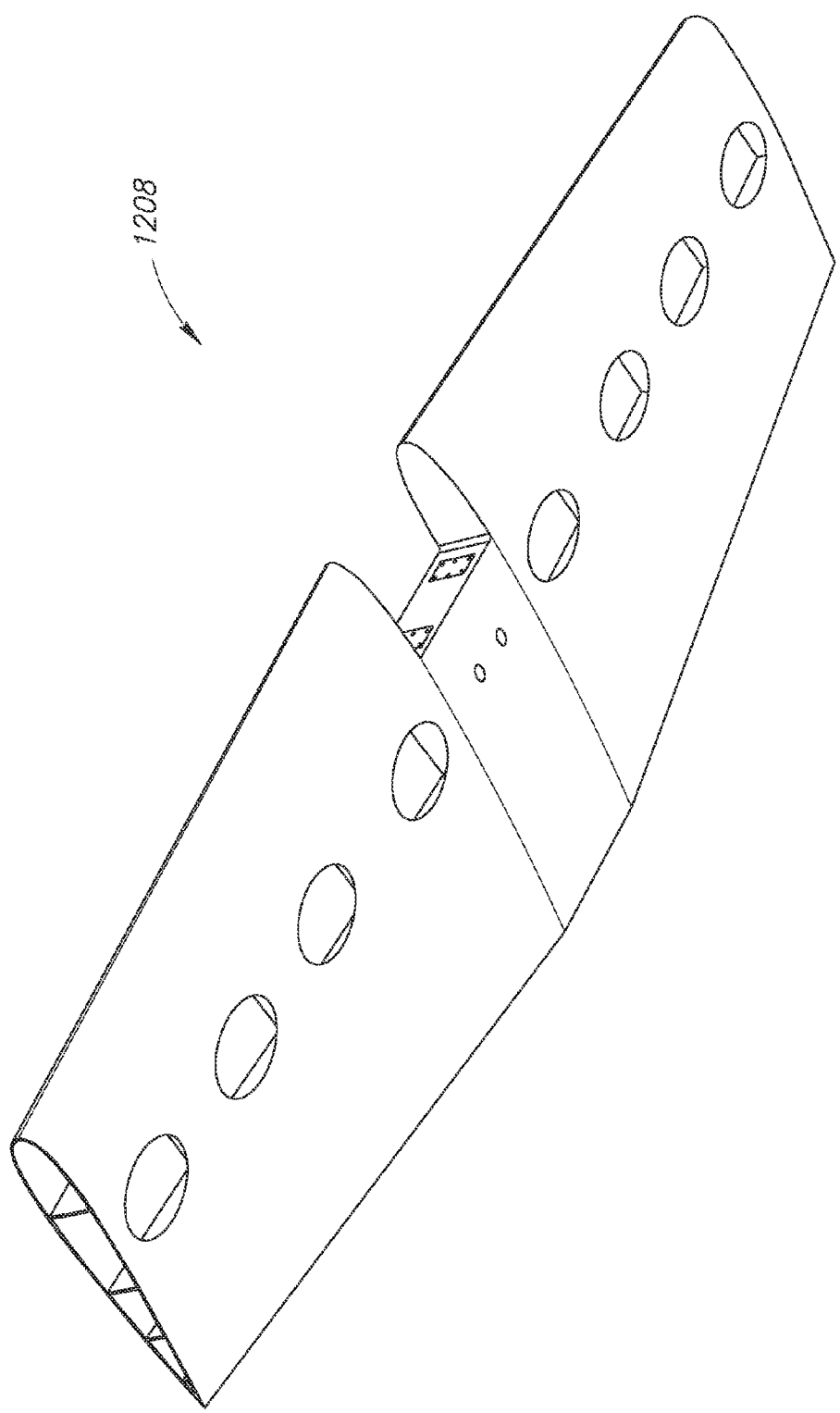
FIG. 26C is a bottom, right perspective view of a finished (i.e., post-cured) stabilator according to an embodiment of the present invention.
Figure 26D:
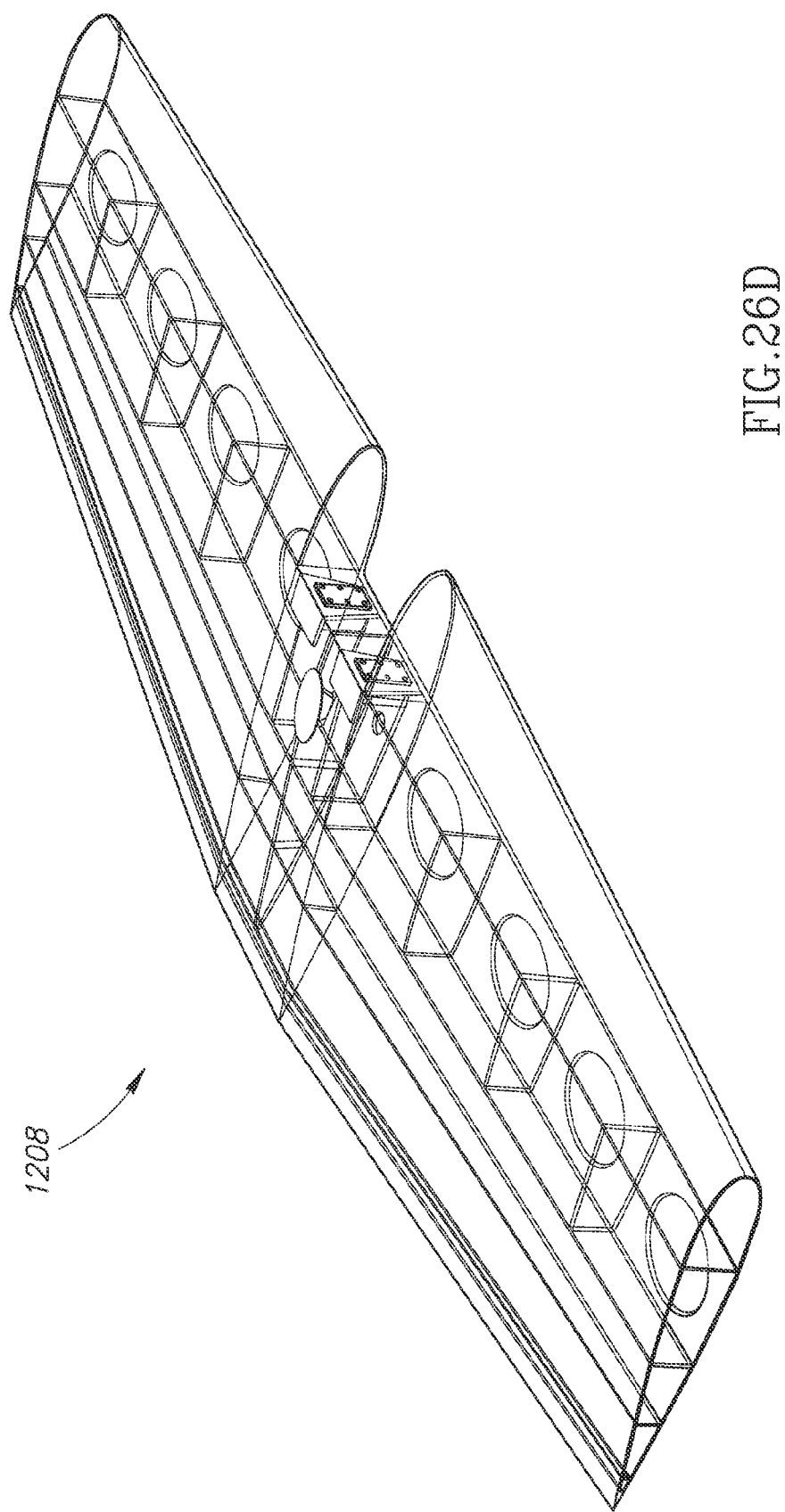
FIG. 26D is a top, left perspective view of the finished stabilator of FIG. 26C with the skins purposefully made transparent to show the embedded or encapsulated mechanical features, ribs and spars of the stabilator according to an embodiment of the present invention.

FIG. 26C shows a finished, post-cured stabilator 1208. FIG. 26D shows the finished, post cured stabilator 1208 with the skins made transparent for the purpose of showing the internal ribs, spars and mechanical features of the stabilator 1208.

The above-described processes and resulting composite structures incorporate cored members into the structures. Consequently, composite structures with cored members selectively embedded therein may be manufactured with large spans between ribs or other supports. This assembly process may advantageously result in ribs and spars that do not require fasteners or flange overlap plies, which in turn significantly reduces the weight of the overall composite structure. Further, if additional ribs and spars were to be added to the composite structure, then the thicknesses of the cored members could be substantially reduced because the span between them is reduced. In short, the inclusion of the cored members according to the described process permits a variety of design options that were not previously available. It should be further noted that reduced fiber ply counts and lighter weight implies reduced cost.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making a composite structure, the method comprising:
   arranging a plurality of pressurizable members to form an assembly, each of the pressurizable members having a desired shape before pressurization that includes an outer surface and an inner surface defining a volumetric region, each of the pressurizable members further having an opening to permit internal pressurization thereof, wherein at least one of the pressurizable members includes a molded recessed region;
   arranging at least one layer of fiber plies onto at least one surface of each of the plurality of pressurizable members, wherein at least some of the plies are pressed into the recessed region to substantially conform therewith;
   wrapping a mechanical feature with fiber plies, the mechanical feature having a shape that is complimentary to the molded recessed region, wherein the mechanical feature is multi-faceted and includes a tapered section and a stud portion;
   placing the wrapped mechanical feature into the molded recessed region of the at least one of the pressurizable members;
   placing at least one cored member into a second molded recessed region of the at least one of the pressurizable members;
   arranging either at least one solid laminate ply or at least one bridge ply adjacent to the at least one cored member, wherein the either at least one solid laminate ply or at least one bridge ply is configured to prevent the cored member from deforming;
   arranging at least another layer of fiber plies onto the mechanical feature and the at least one of the pressurizable members to form the assembly;
   placing the assembly in a tool;
   providing an internal pressure to the pressurizable members; and
   providing an external pressure to the assembly to form the composite structure, wherein the internal and external pressures operate to compress the fiber plies to encapsulate the mechanical feature while substantially minimizing voids between the fiber plies and the mechanical feature.

2. The method of claim 1, further comprising adjusting the internal pressure, external pressure, or both to minimize wrinkling of the fiber plies near fillet sections.

3. The method of claim 1, wherein the mechanical feature includes a locating member that is not wrapped with fiber plies.

4. The method of claim 1 wherein the stud portion is threaded.

5. The method of claim 1, wherein at least one of the pressurizable members includes a cusp, wherein the cusp is configured to react to a pressure from the at least one of pressurizable members.

6. The method of claim 1, further comprising embedding at least one fillet section, wherein the fillet section is embedded within the at least one layer of fiber plies and the at least another layer of fiber plies.

7. The method of claim 1, wherein the composite structure is one of a landing gear door actuator, an aileron, a passenger door, or a wing.

8. The method of claim 1, wherein the mechanical feature is an angle fitting.

9. A method of making a composite structure, the method comprising:
arranging a plurality of pressurizable members to form an assembly, each of the pressurizable members having a desired shape before pressurization that includes an outer surface and an inner surface defining a volumetric region, each of the pressurizable members further having an opening to permit internal pressurization thereof, wherein at least one of the pressurizable members includes a molded recessed region;
arranging at least one layer of fiber plies onto at least one surface of each of the plurality of pressurizable members, wherein at least some of the plies are pressed into the recessed region to substantially conform therewith;
wrapping a metallic mechanical feature with fiber plies, the mechanical feature having a shape that is complimentary to the molded recessed region, wherein the mechanical feature is multi-faceted and includes a tapered section and a stud portion;
placing the metallic wrapped mechanical feature into the molded recessed region of the at least one of the pressurizable members;
placing at least one cored member into a second molded recessed region of the at least one of the pressurizable members;
arranging either at least one solid laminate ply or at least one bridge ply adjacent to the at least one cored member, wherein the either at least one solid laminate ply or at least one bridge ply is configured to prevent the cored member from deforming;
arranging at least another layer of fiber plies onto the metallic mechanical feature and the at least one of the pressurizable members to form the assembly;
placing the assembly in a tool;
providing an internal pressure to the pressurizable members; and providing an external pressure to the assembly to form the composite structure, wherein the internal and external pressures operate to compress the fiber plies to encapsulate the metallic mechanical feature while substantially minimizing voids between the fiber plies and the metallic mechanical feature.

10. The method of claim 9 wherein the stud portion is threaded.

* * * * *